(12) United States Patent
Koshti

(10) Patent No.: US 11,841,333 B1
(45) Date of Patent: Dec. 12, 2023

(54) SYSTEM AND METHOD FOR CRACK DETECTION

(71) Applicant: United States of America as represented by the Administrator of NASA, Washington, DC (US)

(72) Inventor: Ajay M Koshti, League City, TX (US)

(*) Notice: Subject to any disclaimer, the term of this patent is extended or adjusted under 35 U.S.C. 154(b) by 0 days.

(21) Appl. No.: 17/654,192

(22) Filed: Mar. 9, 2022

Related U.S. Application Data

(63) Continuation-in-part of application No. 17/454,865, filed on Nov. 15, 2021.

(60) Provisional application No. 63/159,954, filed on Mar. 11, 2021.

(51) Int. Cl.
  *G01N 23/18* (2018.01)

(52) U.S. Cl.
  CPC ......... *G01N 23/18* (2013.01); *G01N 2223/40* (2013.01); *G01N 2223/646* (2013.01)

(58) Field of Classification Search
  CPC ............... G01N 23/18; G01N 2223/40; G01N 2223/646
  See application file for complete search history.

(56) References Cited

U.S. PATENT DOCUMENTS

| | | | |
|---|---|---|---|
| 6,658,089 B1 | 12/2003 | Mohr et al. | |
| 7,999,219 B2 | 8/2011 | Skuse et al. | |
| 8,577,120 B1 | 11/2013 | Koshti | |
| 9,720,114 B2 | 8/2017 | Blagojevic et al. | |
| 9,787,913 B1 | 10/2017 | Koshti | |
| 10,545,100 B2 | 1/2020 | Buijsse et al. | |
| 10,620,133 B1 | 4/2020 | Koshti | |
| 2004/0066188 A1 | 4/2004 | Goldfine et al. | |
| 2020/0232938 A1 | 7/2020 | Fitzgerald et al. | |

(Continued)

FOREIGN PATENT DOCUMENTS

| | | | | |
|---|---|---|---|---|
| WO | WO-2012050803 A2 | * | 4/2012 | ................ B64F 5/00 |
| WO | WO-2019197829 A1 | * | 10/2019 | ............. G01N 23/04 |
| WO | WO-2021029625 A1 | * | 2/2021 | ......... G01N 21/9501 |

OTHER PUBLICATIONS

Ajay Koshti, "Assessing Visual and System Flaw Detectability in Nondestructive Evaluation", Proceedings of SPIE vol. 11592, Mar. 2021.

(Continued)

*Primary Examiner* — Mark R Gaworecki
(74) *Attorney, Agent, or Firm* — David G. Matthews; Edward K. Fein

(57) ABSTRACT

A method for detecting a target flaw using a radiographic inspection system includes selecting a plurality of simulated flaws. The method also includes performing a flaw detection simulation on the simulated flaws. The method also includes determining a plurality of output indication parameters for each of the simulated flaws based at least partially upon the flaw detection simulation. The output indication parameters include a contrast-to-noise ratio (CNR), a resolution ratio, a length-to-width (L/W) indication ratio, and a probability parameter. The method also includes determining a contrast-to-noise ratio sensitivity function (CNR SF) based at least partially upon the output indication parameters. The method also includes qualifying the radiographic inspection system to detect the target flaw based at least partially upon the CNR SF.

20 Claims, 23 Drawing Sheets

| | CNR | Aspect Ratio | Resolution Ratio |
|---|---|---|---|
| Simulated Crack | ↕ | ↕ | ↕ |
| Simulated Cracklike Calibration Flaw | ↕ | ↕ | ↕ |
| Real Crack | | | |
| IQI | | | |

(56) References Cited

U.S. PATENT DOCUMENTS

2021/0334587 A1* 10/2021 Wang ................ G06N 3/08

OTHER PUBLICATIONS

I Elshafiey, "Optimization Tool for X-ray Radiography NDE", Review of Progress in Quantitative Nondestructive Evaluation, vol. 15, 1996.

Ajay Koshti, "Using requirements on merit ratios for assessing reliability of NDE flaw detection", Proceedings of SPIE vol. 11593, Mar. 2021.

Ajay Koshti, "Using requirements on merit ratios for assessing reliability of NDE flaw detection in multi-hit detection in digital radiography", Proceedings of SPIE 11593, Mar. 2021.

Ajay Koshti, "Assessment of flaw detectability using transfer function", Proceedings of SPIE vol. 11592, Mar. 2021.

Ajay Koshti, "Optimizing raster scanning parameters in nondestructive evaluation using simulation of probe sensitivity field", Proceedings of SPIE vol. 11592, Mar. 2021.

Ajay Koshti, "Modeling reliability of NDE method providing C-scan: a case of flaw field simulation", Proceedings of SPIE vol. 11593, Mar. 2021.

Ajay Koshti, "Modeling the x-ray process and x-ray flaw size parameter for POD studies", Proceedings of SPIE vol. 9063, Mar. 2014.

Ajay Koshti, "Nondestructive Characterization for Composite Materials, Aerospace Engineering, Civil Infrastructure, and Homeland Security 2014", Proceedings of SPIE vol. 9063.

Muzibur Khan et al. (2019), "Computer Radiography for High Resolution Imaging Applications of Aircraft Structures", NDT in Aerospace 11th International Symposium, vol. 25(2), Paris-Saclary,France, 7 pages.

Office of the NASA Chief Engineer, "Nondestructive Evaluation Requirements for Fracture-Critical Metallic Components", NASA-STD-5009B, May 8, 2019, 55 pages. https://www.nde-ed.org/NDEEngineering/SafeDesign/nasa-std-5009b.pdf.

Ajay Koshti, "Simulating the x-ray image contrast to setup techniques with desired flaw detectability", Proceedings of SPIE vol. 9437, Apr. 1, 2015, 11 pages.

Ajay Koshti, "X-ray ray tracing simulation and flaw parameters for crack detection", Proceedings of SPIE vol. 10600, Mar. 27, 2018, 19 pages.

NASA Engineering & Safety Center (2019), "90/95 POD Radiography Concern for COPVs and Metal Tank Welds", 2019 NESC Technical Bulletin No. 19-02, 1 page. https://www.nasa.gov/nesc/technicalbulletins.

Ajay M. Koshti "Probability of detection analysis in multi-hit flaw detection", Proc. SPIE 11594, NDE 4.0 and Smart Structures for Industry, Smart Cities, Communication, and Energy, 115940K, Apr. 5, 2021, 14 pages. https://doi.org/10.1117/12.2595733.

Ewert, U., & Zscherpel, U. (2014). Minimum Requirements for Digital Radiography Equipment and Measurement Procedures by Different Industries and Standard Organizations. 11th European Conference on Non-Destructive Testing (ECNDT 2014), Prague 2014, Oct. 6-11. e-Journal of Nondestructive Testing vol. 19(12), 18 pages. https://www.ndt.net/?id=16708.

Khan, M., & Brothers, M. (2018). Equivalent Penetrameter Sensitivity for Performance Evaluation of Computed Radiography Systems. 12th European Conference on Non-Destructive Testing (ECNDT 2018), Gothenburg 2018, Jun. 11-15. e-Journal of Nondestructive Testing vol. 23(8), 9 pages. https://www.ndt.net/?id=22782.

* cited by examiner

|  | CNR | Aspect Ratio | Resolution Ratio |
|---|---|---|---|
| Simulated Crack | ↕ | ↕ | ↕ |
| Simulated Cracklike Calibration Flaw | | | |
| Real Crack | | | |
| IQI | | | |

FIG. 6A

|  | CNR | Aspect Ratio | Resolution Ratio |
|---|---|---|---|
| Simulated Crack | ↘ | ↘ | ↘ |
| Simulated Cracklike Calibration Flaw | | | |
| Real Crack | | | |
| IQI | | | |

FIG. 6B

|  | CNR | Aspect Ratio | Resolution Ratio |
|---|---|---|---|
| Simulated Crack |  |  |  |
| Simulated Cracklike Calibration Flaw |  |  |  |
| Real Crack |  |  |  |
| IQI | ↕ | ↕ | ↕ |

FIG. 6C

|  | CNR | Aspect Ratio | Resolution Ratio |
|---|---|---|---|
| Simulated Crack |  |  |  |
| Simulated Cracklike Calibration Flaw | ↶ | ↶ | ↶ |
| Real Crack |  |  |  |
| IQI |  |  |  |

FIG. 6D

SYSTEM AND METHOD FOR CRACK DETECTION

CROSS-REFERENCE TO RELATED APPLICATIONS

This patent application is a continuation-in-part (CIP) of U.S. patent application Ser. No. 17/454,865, filed on Nov. 15, 2021, which claims priority to U.S. Provisional Patent Application No. 63/159,954, filed on Mar. 11, 2021, the entirety of which is incorporated by reference herein.

BACKGROUND

Radiographic inspection is commonly used for detection of cracks in metallic and non-metallic parts. These parts requiring a radiographic inspection may be referred to as component parts. The radiographic inspection may include X-ray inspection to detect cracks in a component part. The component parts to be inspected may include aircraft fuselage, aircraft wings, fuel tanks, boilers, fan blades, combustor cases, and other metal parts. The radiographic inspection of the component parts may include inspections of welds on the component parts to detect cracks. Radiographic inspection of component parts is performed to provide reliable detection of a certain minimum size of cracks or similar cracklike flaws. These cracks and cracklike flaws having at least a minimum sized flaw may be referred to as target-sized flaws.

A radiographic inspection of a part may be performed using a selected radiographic inspection technique. An inspection technique includes a test set-up and has inspection requirements that may describe the inspection set-up. An inspection technique performed in accordance with the selected inspection technique may need to be performed on a sample part with real cracks to validate that the inspection technique can detect target-sized flaws in a component part at an acceptable quality level. Performance of an inspection technique on a sample part with real cracks may not be practical for each component part due to the substantial time and costs for manufacturing the sample part and performing the inspection technique on the sample part.

There is a need for a practical and improved inspection system and method that validates an inspection technique configured to detect target-sized flaws in component parts.

SUMMARY

A method for detecting a target flaw using a radiographic inspection system is disclosed. The method includes selecting a plurality of simulated flaws. The method also includes performing a flaw detection simulation on the simulated flaws. The method also includes determining a plurality of output indication parameters for each of the simulated flaws based at least partially upon the flaw detection simulation. The output indication parameters include a contrast-to-noise ratio (CNR), a resolution ratio, a length-to-width (L/W) indication ratio, and a probability parameter. The method also includes determining a contrast-to-noise ratio sensitivity function (CNR SF) based at least partially upon the output indication parameters. The method also includes qualifying the radiographic inspection system to detect the target flaw based at least partially upon the CNR SF.

In another embodiment, the method may include selecting a plurality of simulated flaws. Each of the simulated flaws has a simulated flaw size. The method also includes performing a flaw detection simulation on the simulated flaws. The method also includes determining a plurality of output indication parameters for each of the simulated flaws based at least partially upon the flaw detection simulation. The output indication parameters include a contrast-to-noise ratio (CNR), a resolution ratio, a length-to-width (L/W) indication ratio, and a probability parameter. The method also includes determining a contrast-to-noise ratio sensitivity function (CNR SF) based at least partially upon the output indication parameters. The CNR SF includes a CNR range, a resolution ratio range, a L/W indication ratio range, and a probability parameter threshold value. The method also includes qualifying the radiographic inspection system to detect the target flaw based at least partially upon the CNR SF.

In another embodiment, the method includes selecting a plurality of simulated flaws. Each of the simulated flaws has a simulated flaw size. The method also includes performing a flaw detection simulation on the simulated flaws. The method also includes determining a plurality of output indication parameters for each of the simulated flaws based at least partially upon the flaw detection simulation. The output indication parameters comprise a contrast-to-noise ratio (CNR), a resolution ratio, a length-to-width (L/W) indication ratio, and a probability parameter. The probability parameter includes a probability of detection (POD), a probability of false positive (POF), or both for each of the simulated flaws at least partially in response to performing the flaw detection simulation. The method also includes determining a contrast-to-noise ratio sensitivity function (CNR SF) based at least partially upon the output indication parameters. The CNR SF includes a CNR range, a resolution ratio range, a L/W indication ratio range, and a probability parameter threshold value. The method also includes determining that a CNR value for the target flaw is greater than or equal to a corresponding CNR value of the CNR SF to qualify the radiographic inspection system to detect the target flaw. The method also includes inspecting a component part using the qualified radiographic inspection system to detect one or more cracks therein with a size that is greater than or equal to a size of the target flaw. The method also includes repairing the one or more cracks in the component part or discarding the component part in response to the detection of the one or more cracks.

BRIEF DESCRIPTION OF THE DRAWINGS

The following figures form part of the present specification and are included to further demonstrate certain aspects of the presently described subject matter and should not be used to limit it. The present subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIGS. 6A-6D illustrate charts showing correlations, according to an embodiment.

DETAILED DESCRIPTION

Reference will now be made in detail to specific embodiments illustrated in the accompanying drawings and figures. In the following detailed description, numerous specific details are set forth in order to provide a thorough understanding of the embodiments described herein. However, it will be apparent to one of ordinary skill in the art that other embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Figure 1A:
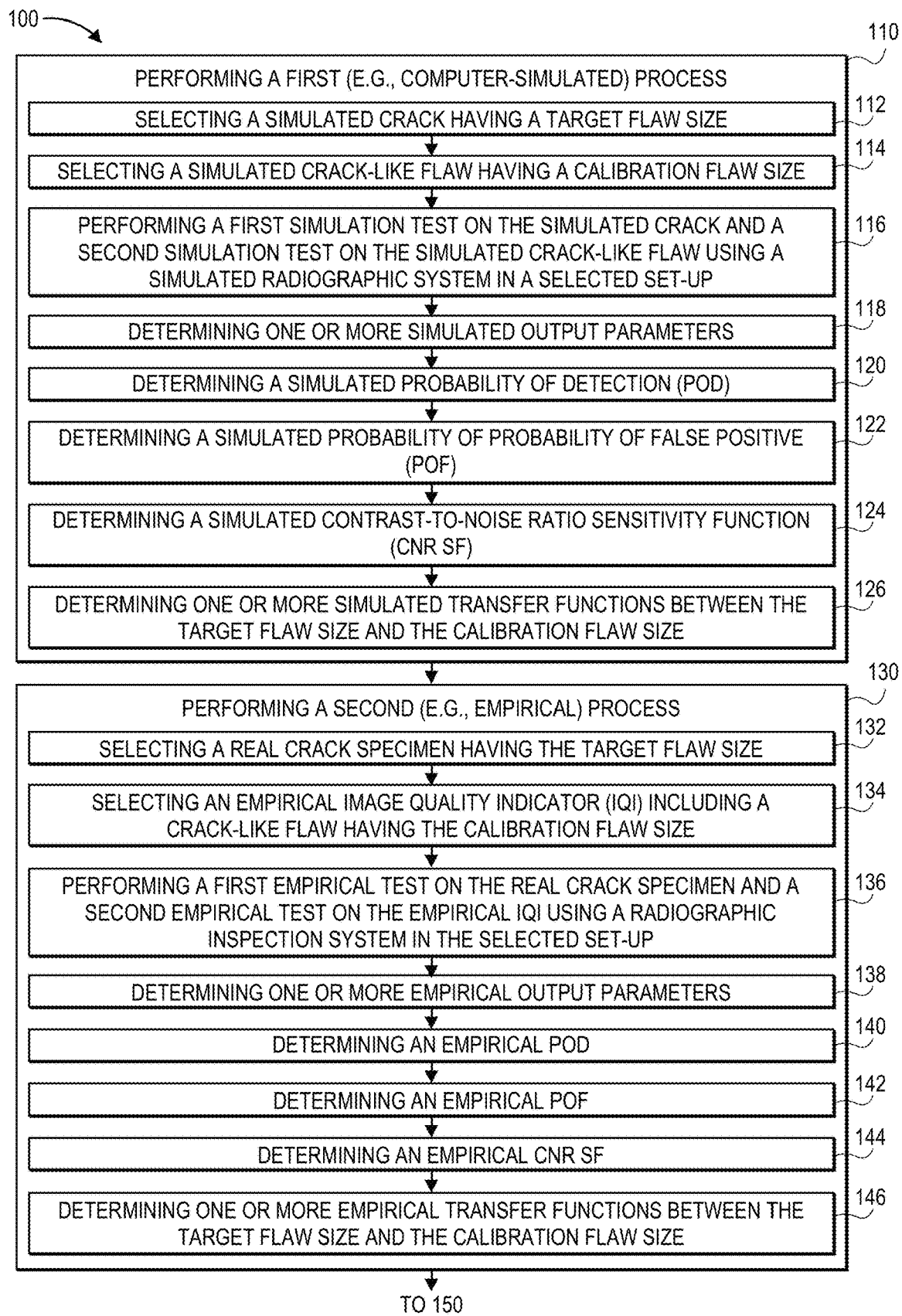
FIGS. 1A and 1B illustrate a flowchart of a method for qualifying a radiographic inspection system in a selected set-up to make a crack detectability determination, according to an embodiment.
Figure 1B:
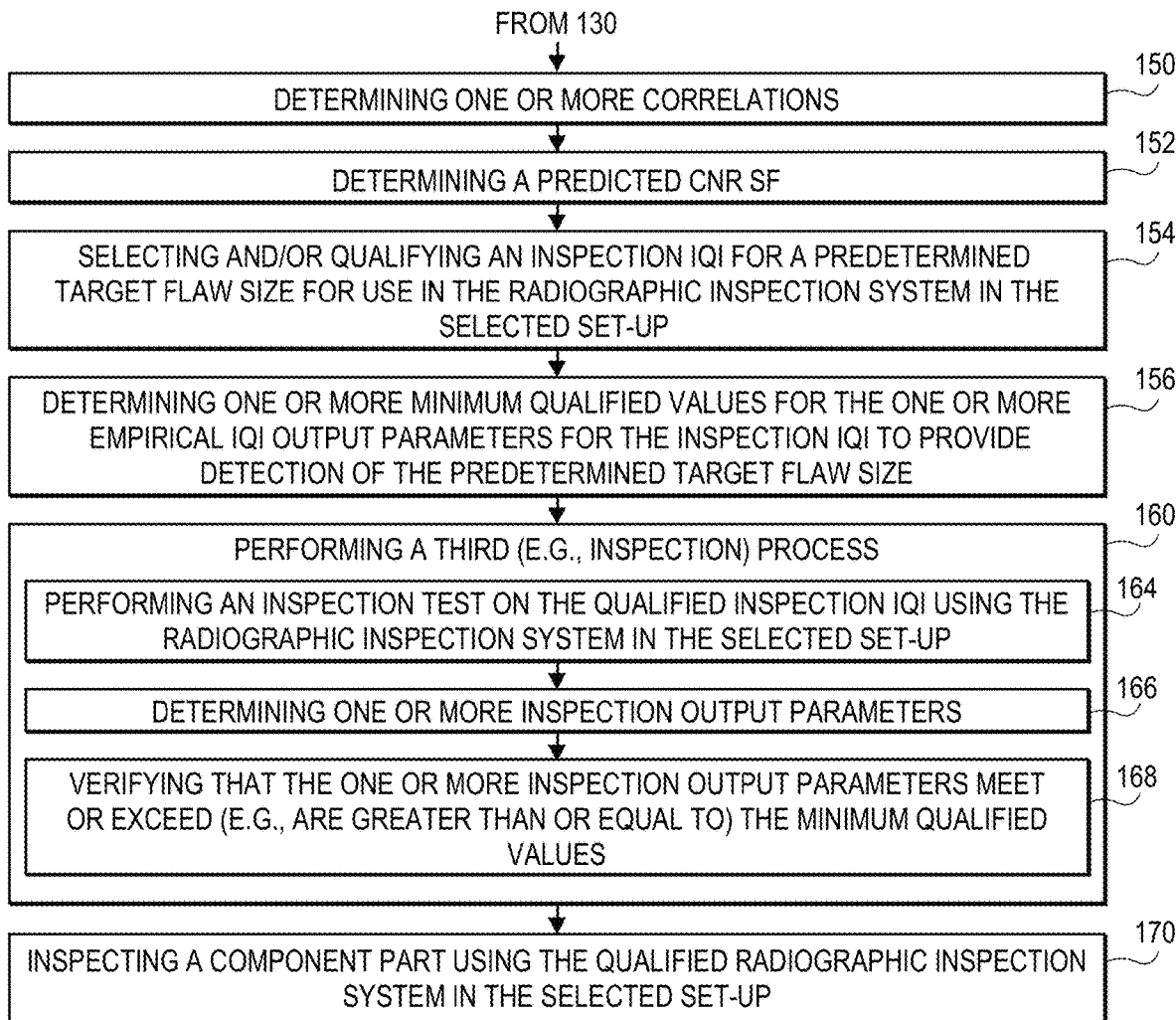

FIGS. 1A and 1B illustrate a flowchart of a method 100 for qualifying a radiographic inspection system in a selected set-up to make a crack detectability determination, according to an embodiment. An illustrative order of the method 100 is provided below; however, one or more steps of the method 100 may be performed in a different order, split into sub-steps, combined, repeated, or omitted.

The method 100 may include performing a first (e.g., computer-simulated) process, as at 110. As the name suggests, the computer-simulated process may include one or more simulations that is/are performed on a computing system.

The computer-simulated process may include selecting a simulated crack having a target flaw size, as at 112. The computer-simulated process may also include selecting a simulated crack-like flaw having a calibration flaw size, as at 114. A crack refers to a controlled fatigue-induced crack, and a crack-like flaw refers to a narrow machined slot. The target flaw size refers to the smallest size of flaws that need to be detected reliably in x-ray inspection, and the calibration flaw size refers to the flaw size that will be used in a calibration reference standard which will be used for standardizing (e.g., calibrating) the x-ray technique.

Figure 2B:
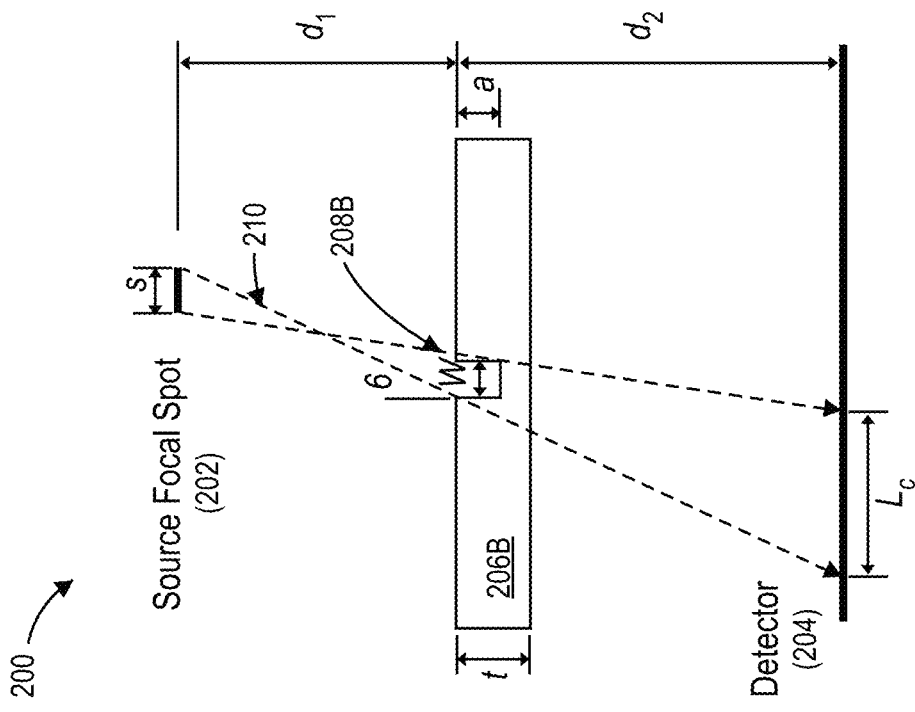
FIGS. 2A and 2B illustrate side views of a simulated radiographic system in a selected set-up performing first (e.g., simulation) tests, according to an embodiment.
Figure 2A:
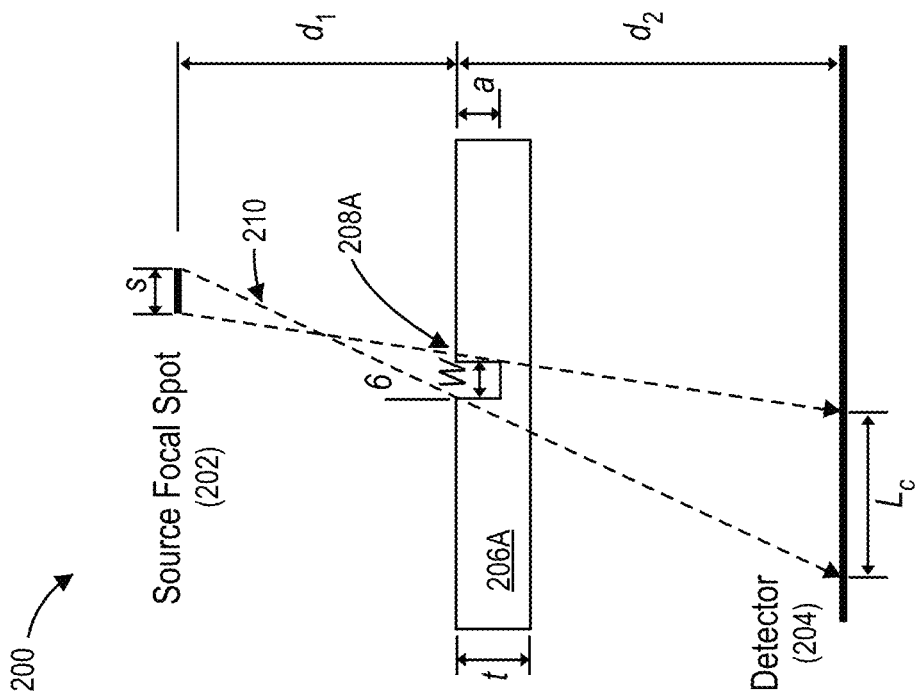

The computer-simulated process may also include performing a first simulation test on the simulated crack and a second simulation test on the simulated crack-like flaw using a simulated radiographic system in a selected set-up, as at 116. The simulation tests may be performed using the computing system. FIGS. 2A and 2B illustrate side views of a simulated radiographic system 200 in the selected set-up, according to an embodiment. The simulated radiographic system 200 may include a simulated radiation source 202 and a simulated detector (e.g., film) 204. In the selected set-up, a first simulated part 206A having the simulated crack 208A and/or a second simulated part 206B having the simulated crack-like flaw (also referred to as a simulated target flaw) 208B may be positioned between the simulated radiation source 202 and the simulated detector 204. During the simulation tests, the simulated radiation source 202 transmits simulated radiation rays 210 that pass through the simulated parts 206A, 206B to the simulated detector 204, which records a detected image. The detected image(s) may correspond to characteristics of the simulated crack 208A having the target flaw size and/or the simulated crack-like flaw 208B having the calibration flaw size.

The computer-simulated process may also include determining one or more simulated output parameters, as at 118. The simulated output parameters may be based upon the first and second simulation tests. In one embodiment, the simulated output parameters may include a simulated contrast-to-noise ratio (CNR), a simulated indication aspect ratio, a simulated resolution ratio, or a combination thereof. The CNR refers to the contrast-to-noise ratio, where the difference between the average gray value of indication pixels and the surrounding area pixels (or background) is defined as contrast, and the standard deviation of the gray value of pixels in the background is defined as noise. The indication aspect ratio refers to the ratio of the length to the width of the crack or flaw indication. The resolution ratio refers to the ratio of a crack or flaw linear indication width to the total (image) unsharpness (at the detector). The resolution ratio is used to address the resolution in the detection of linear indications of cracks. The term total unsharpness (e.g., at the detector) refers to gap in a duplex wire pair image that is detectable with a small, fixed value (e.g., 20%) of modulation transfer function. This is equivalent to smallest width of a linear indication at the detector that is detectable.

The computer-simulated process may also include determining a simulated probability of detection (POD), as at 120. The simulated POD may be based upon the one or more simulated output parameters. The POD refers to the probability of detecting the simulated crack, the simulated crack-like flaw, or both.

The computer-simulated process may also include determining a simulated probability of false positive (POF), as at 122. The simulated POF may be based upon the one or more simulated output parameters. The POF refers to the probability of a flaw detection call where there is no flaw (i.e., a false positive).

The computer-simulated process may also include determining a simulated contrast-to-noise ratio sensitivity function (CNR SF), as at 124. The simulated CNR SF may be based upon the one or more simulated output parameters, the simulated POD, the simulated POF, or a combination thereof. The CNR SF refers to a (e.g., lower) limit on the CNR as a function of the resolution ratio and/or the indication aspect ratio (e.g., length/width).

Figure 3A:
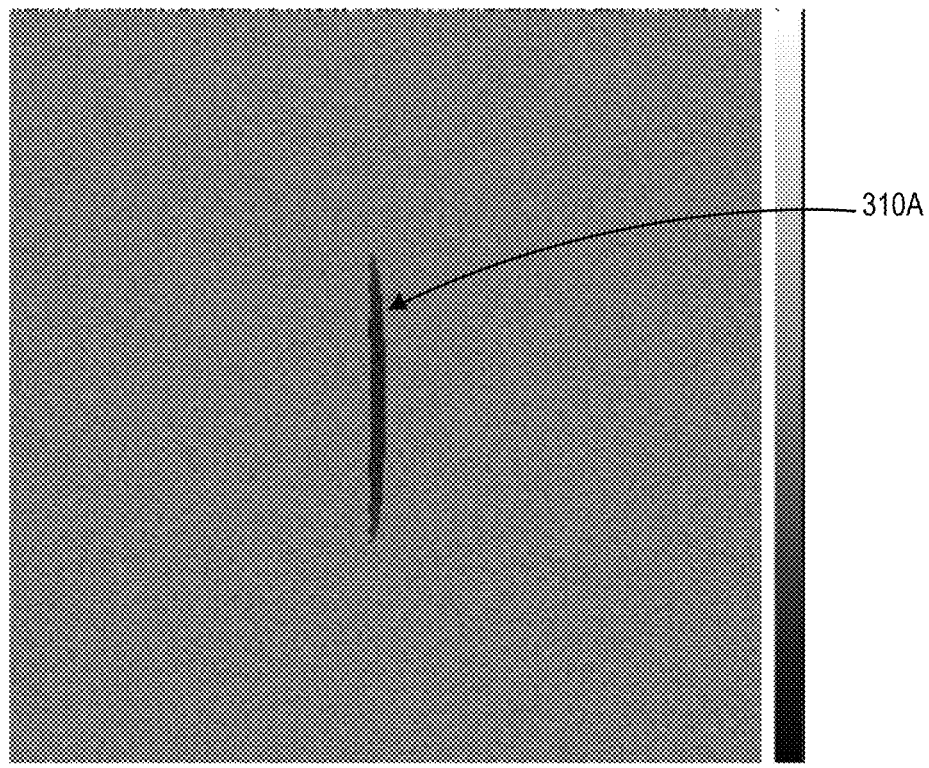
FIGS. 3A-3D illustrate images from an extended 2D model simulation, according to an embodiment.
Figure 3B:
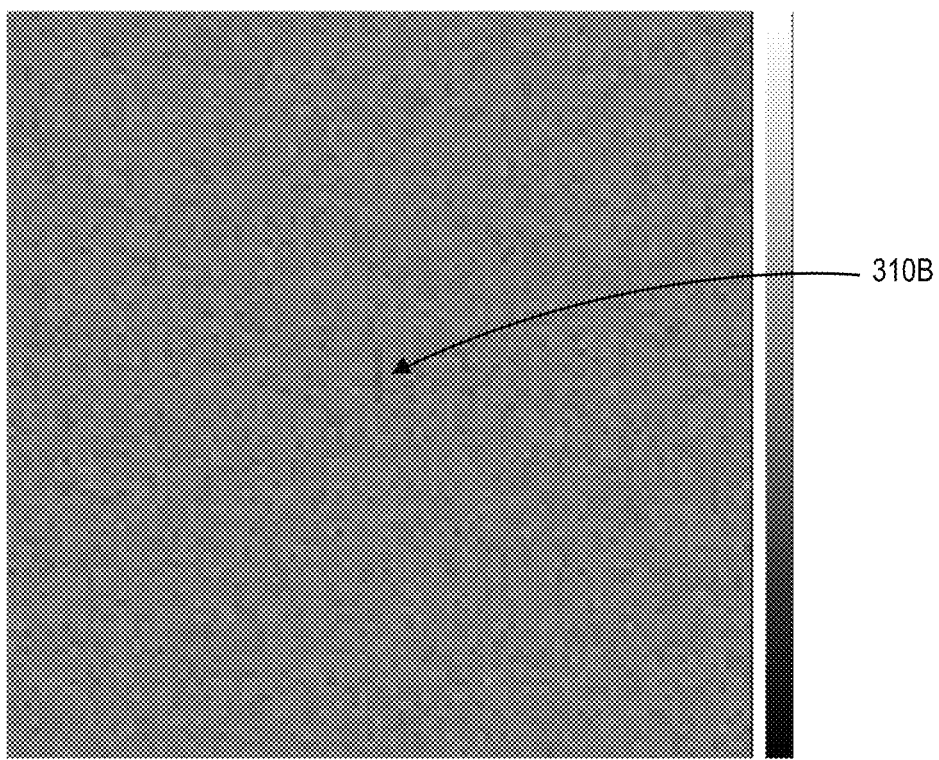

FIGS. 3A and 3B illustrate two images from an extended 2D model simulation, according to an embodiment. The images provide the CNR and resolution ratios (e.g., $R_{r1}$, $R_{r2}$, $R_{r3}$, and $R_{b,n}$). The indication 310A in FIG. 3A has a higher x-ray angle, higher contrast, and higher resolution ratios compared to the indication 310B in FIG. 3B. The indication 310B is narrower than the indication 310A. Both indications 310A, 310B are detectable, but the indication 310A may be detected more reliably. The $R_{b,n}$ value does not account for angle and is higher in the image in FIG. 3A.

In an example, the image in FIG. 3A includes:
Film
Single wall
Angle=6 degrees
Slot width=0.0050 mm
Slot length=1.750 mm
Total unsharpness=0.0226 mm
Contrast sensitivity=1.00%
Normalized resolution ratio=22.147
Pixel pitch=0.0100 mm
Total unsharpness at detector/pitch=2.276
Picture length=20.00 mm
Half max CNR=6.77
Number of pixels above 50% peak=1281
Number of pixels in width=9
Number of pixels in length=173
Indication length/width=19.22
Crack geometric indication width to total unsharpness at detector ration 1=5.91
Crack indication width to total unsharpness at detector ratio 2=6.74
Crack image half max width to total unsharpness at detector ratio 3=3.95
POD=100.00%
POF=0.00%
Number of POD calculations=30

In an example, the image in FIG. 3B includes:
Film
Single wall
Angle=6 degrees
Slot width=0.0050 mm
Slot length=0.994 mm
Total unsharpness=0.0236 mm
Contrast sensitivity=0.50%
Normalized resolution ratio=4.473
Pixel pitch=0.1000 mm
Total unsharpness at detector/pitch=2.254
Picture length=200.00 mm
Half max CNR=2.62
Number of pixels above 50% peak=7
Number of pixels in width=1
Number of pixels in length=7
Indication length/width=7.00
Crack geometric indication width to total unsharpness at detector ration 1=0.34
Crack indication width to total unsharpness at detector ratio 2=3.07
Crack image half max width to total unsharpness at detector ratio 3=0.44
POD=99.89%
POF=0.11%
Number of POD calculations=7

Figure 3C:
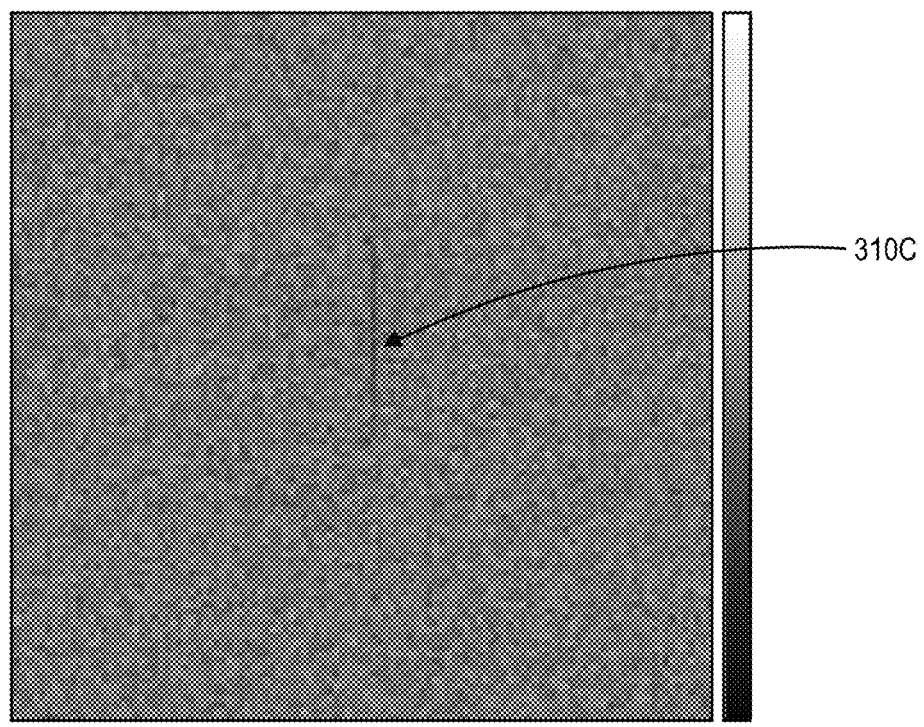
Figure 3D:
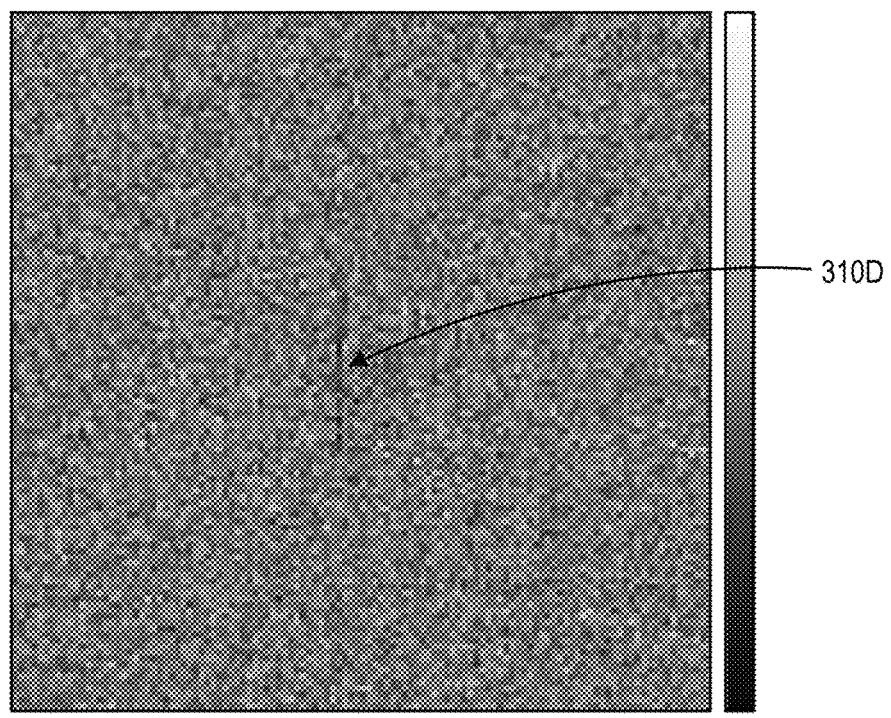

FIGS. 3C and 3D illustrate two more images from an extended 2D model simulation, according to an embodiment. The images provide the CNR and resolution ratios (e.g., $R_{r1}$, $R_{r2}$, $R_{r3}$, and $R_{b,n}$). The indication 310C in FIG. 3C has a contrast sensitivity of 1%, and the indication 310D in FIG. 3D has a contrast sensitivity of 2%. The rest of the inputs are the same. Contrast sensitivity defines noise level and affects CNR directly. As may be seen, the indication 310D is fainter while the indication 310C may be more easily detectable.

In an example, the image in FIG. 3C includes:
Film
Single wall
Angle=6 degrees
Slot width=0.0050 mm
Slot length=1.750 mm
Total unsharpness=0.1169 mm
Contrast sensitivity=1.00%
Normalized resolution ratio=4.277
Pixel pitch=0.0500 mm
Total unsharpness at detector/pitch=2.358
Picture length=100.00 mm
Half max CNR=2.54
Number of pixels above 50% peak=31
Number of pixels in width=1
Number of pixels in length=33
Indication length/width=33

Crack geometric indication width to total unsharpness at detector ration 1=1.15
Crack indication width to total unsharpness at detector ratio 2=3.14
Crack image half max width to total unsharpness at detector ratio 3=0.42
POD=100.00%
POF=0.00%
Number of POD calculations=30
In an example, the image in FIG. 3D includes:
Film
Single wall
Angle=0.0 degrees
Slot width=0.0050 mm
Slot length=1.750 mm
Total unsharpness=0.1169 mm
Contrast sensitivity=2.00%
Normalized resolution ratio=2.139
Pixel pitch=0.0500 mm
Total unsharpness at detector/pitch=2.358
Picture length=100.00 mm
Half max CNR=1.50
Number of pixels above 50% peak=22
Number of pixels in width=1
Number of pixels in length=33
Indication length/width=33
Crack geometric indication width to total unsharpness at detector ration 1=0.05
Crack indication width to total unsharpness at detector ratio 2=2.08
Crack image half max width to total unsharpness at detector ratio 3=0.42
POD=100.00%
POF=0.00%
Number of POD calculations=30

Figure 4A:
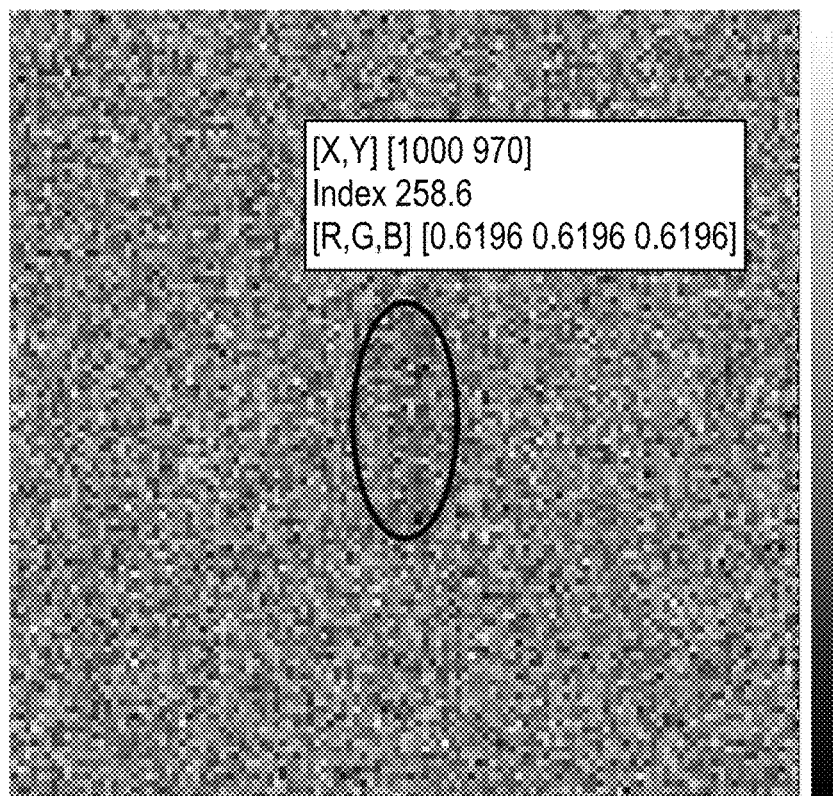
FIGS. 4A and 4B illustrate simulated indication images for which CNRs, resolution ratios, length/width ratios, PODs, and POFs are calculated for a selected set-up and x-ray angle, according to an embodiment.
Figure 4B:
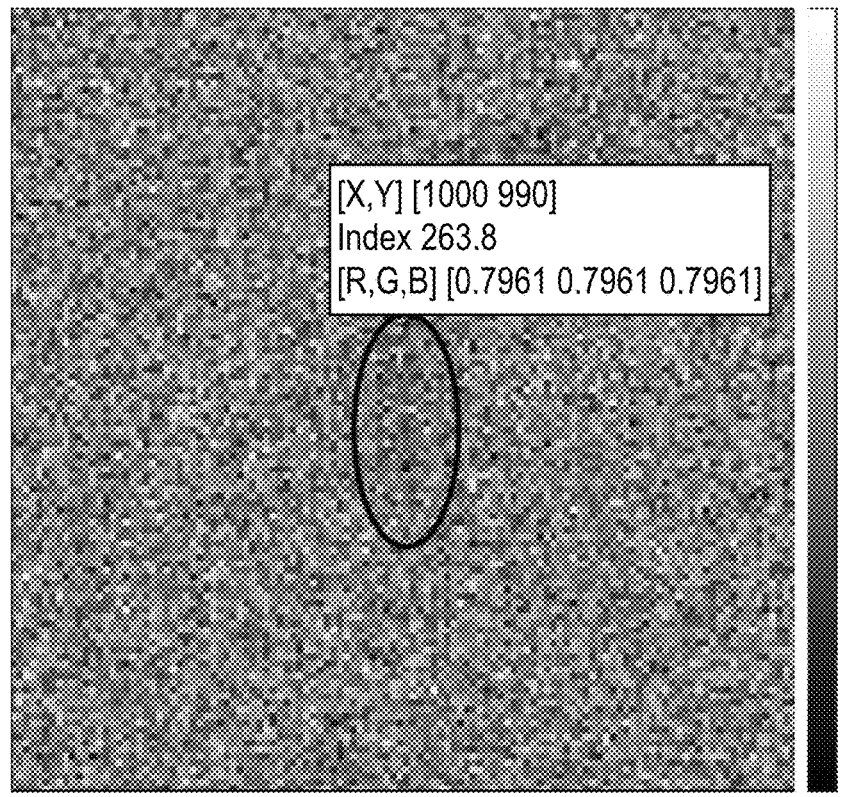

FIGS. 4A and 4B illustrate two images showing simulated CNRs and resolution ratio maps as a function of slot width and x-ray angle, according to an embodiment. The two images are for the same set-up but have a different x-ray angle. FIG. 4A shows a high POD for a low CNR. FIG. 4B shows a low POD and lower CNR. As the x-ray angle increases from 4 degrees in FIG. 4A to 5 degrees in FIG. 4B, the flaw detectability transitions from being detectable to undetectable for the simulation. The transition from detectable to undetectable provides a data point on the CNR SF surface. The CNR SF surface can be correlated to the actual CNR SF based at least partially upon empirical data. Such correlation can be referred to as a transfer function for CNR SF. The differences between the two CNR SFs may be due to differences in crack morphology of real flaws versus those used in simulation.

In an example, the image in FIG. 4A includes:
Film
Single wall
Angle=4.0 degrees
Slot width=0.0020 mm
Slot length=0.994 mm
Total unsharpness=0.0197 mm
Contrast sensitivity=3.00%
Normalized resolution ratio=3.379
Pixel pitch=0.0250 mm
Total unsharpness at detector/pitch=2.367
Picture length=50.00 mm
Half max CNR=0.63
Number of pixels above 50% peak=165
Number of pixels in width=7
Number of pixels in length=37
Indication length/width=5.29
Crack geometric indication width to total unsharpness at detector ration 1=2.63
Crack indication width to total unsharpness at detector ratio 2=3.95
Crack image half max width to total unsharpness at detector ratio 3=2.96
POD=100.00%
POF=0.00%
Number of POD calculations=30
In an example, the image in FIG. 4B includes:
Film
Single wall
Angle=5.0 degrees
Slot width=0.0020 mm
Slot length=0.994 mm
Total unsharpness=0.0197 mm
Contrast sensitivity=3.00%
Normalized resolution ratio=3.379
Pixel pitch=0.0250 mm
Total unsharpness at detector/pitch=2.367
Picture length=50.00 mm
Half max CNR=0.60
Number of pixels above 50% peak=181
Number of pixels in width=7
Number of pixels in length=37
Indication length/width=5.29
Crack geometric indication width to total unsharpness at detector ration 1=3.26
Crack indication width to total unsharpness at detector ratio 2=4.40
Crack image half max width to total unsharpness at detector ratio 3=2.96
POD=0.00%
POF=100.00%
Number of POD calculations=30

Referring back to the flowchart 100 in FIG. 1, the computer-simulated process may also include determining one or more simulated transfer functions between the target flaw size and the calibration flaw size, as at 126. The simulated transfer functions may be based on the simulated CNR SF. The simulated transfer functions refer to a correlation between the CNR SF for the simulated crack having the target flaw size and the simulated crack-like flaw having the calibration flaw size.

The method 100 may also include performing a second (e.g., empirical) process, as at 130. The empirical process may be performed before, simultaneously with, or after the computer-simulated process.

The empirical process may include selecting a real crack specimen having the target flaw size, as at 132. The empirical process may also include selecting an empirical image quality indicator (IQI) including a crack-like flaw having the calibration flaw size, as at 134. The real crack specimen refers to a fatigue-induced crack with known length, depth, and crack opening in a specimen. The empirical IQI refers to a physical device containing a fabricated (e.g., electro discharge machined) notch with known length, depth, and opening, where the device is intended for use in actual x-ray inspection of the part.

Figures 5A, 5B:
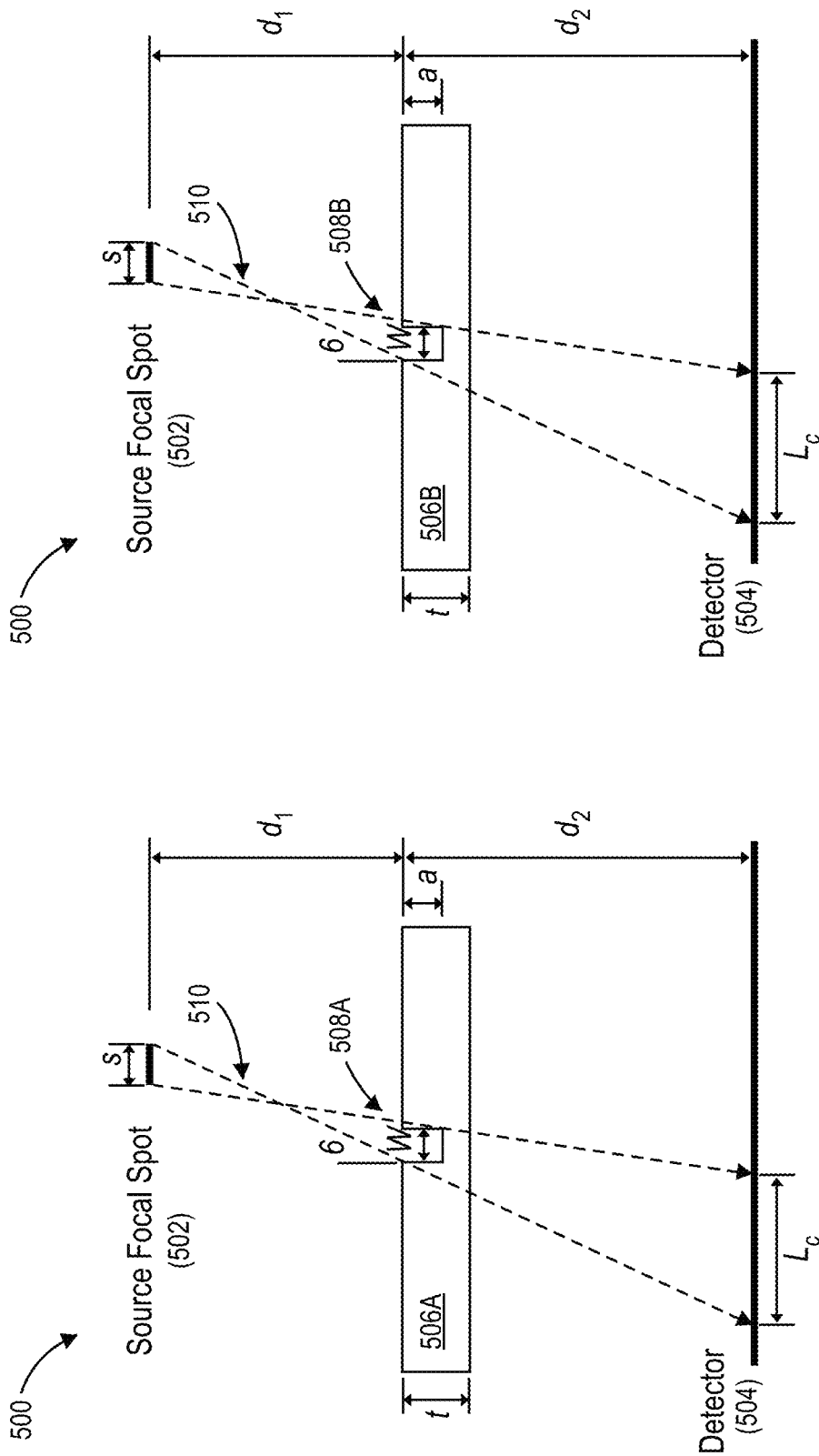
FIGS. 5A and 5B illustrate side views of a radiographic system in the selected set-up performing second (e.g., empirical) tests, according to an embodiment.

The empirical process may also include performing a first empirical test on the real crack specimen and a second empirical test on the empirical IQI using a radiographic inspection system in the selected set-up, as at 136. FIGS. 5A and 5B illustrates side views of a radiographic system 500 in the selected set-up, according to an embodiment. The radiographic system 500 may include a radiation source (i.e., actual, not simulated) 502 and a detector 504 (i.e., actual, not simulated). In the selected set-up, the real crack specimen 506A and/or the empirical IQI 506B may be positioned between the radiation source 502 and the detector 504. During the empirical tests, the radiation source 502 transmits radiation rays 510 that pass through the real crack specimen 506A and the empirical IQI 506B to the detector 504, which records a detected image. The detected image(s) may correspond to characteristics of the real crack specimen 508A having the target flaw size and/or the empirical IQI 506B including the crack-like flaw 508B having the calibration flaw size.

The empirical process may also include determining one or more empirical output parameters, as at 138. The empirical output parameters may be based upon the first and second empirical tests. In one embodiment, the empirical output parameters may include an empirical CNR, an empirical indication aspect ratio, an empirical resolution ratio, or a combination thereof. In another embodiment, the empirical output parameters may include one or more real crack specimen output parameters and one or more empirical IQI output parameters.

The empirical process may also include determining an empirical POD, as at 140. The empirical POD may be based upon the one or more empirical output parameters.

The empirical process may also include determining an empirical POF, as at 142. The empirical POF may be based upon the one or more empirical output parameters.

The empirical process may also include determining an empirical CNR SF, as at 144. The empirical CNR SF may be based upon the one or more empirical output parameters, the empirical POD, the empirical POF, or a combination thereof.

The empirical process may also include determining one or more empirical transfer functions between the target flaw size and the calibration flaw size, as at 146. The empirical transfer functions may be based on the empirical CNR SF. The empirical transfer functions refer to one or more correlations between the CNR SF for the real crack specimen having the target flaw size and the crack-like flaw having the calibration flaw size.

The method 100 may also include determining one or more correlations, as at 150. The correlations may be based upon the simulated CNR SF and the empirical CNR SF. FIGS. 6A-6D illustrates charts of the correlations, according to an embodiment. Thus, in one embodiment, the correlations may include one or more first correlations between the simulated crack and the simulated crack-like flaw, one or more second correlations between the real crack specimen and the empirical IQI, one or more third correlations between the simulated crack and the real crack specimen, one or more fourth correlations between the simulated crack-like flaw and the empirical IQI, or a combination thereof. In another embodiment, the correlations may include a first set of correlations between a CNR of the simulated crack and a CNR of the simulated crack-like flaw, an aspect ratio of the simulated crack and an aspect ratio of the simulated crack-like flaw, and a resolution ratio of the simulated crack and a resolution ratio of the simulated crack-like flaw. The correlations may also include a second set of correlations between a CNR of the real crack specimen and a CNR of the empirical IQI, an aspect ratio of the real crack specimen and an aspect ratio of the empirical IQI, and a resolution ratio of the real crack specimen and a resolution ratio of the empirical IQI. The correlations may also include a third set of correlations between the CNR of the simulated crack and the CNR of the real crack specimen, the aspect ratio of the simulated crack and the aspect ratio of the real crack specimen, and the resolution ratio of the simulated crack and the resolution ratio of the real crack specimen. The correlations may also include a fourth set of correlations between the CNR of the simulated crack-like flaw and the CNR of the empirical IQI, the aspect ratio of the simulated crack-like flaw and the aspect ratio of the empirical IQI, and the resolution ratio of the simulated crack-like flaw and the resolution ratio of the empirical IQI.

The method 100 may also include determining or predicting a predicted CNR SF, as at 152. The predicted CNR SF may be used for crack detection. The predicted CNR SF may be based upon the plurality of correlations.

The method 100 may also include selecting and/or qualifying an inspection IQI for a predetermined target flaw size for use in the radiographic inspection system in the selected set-up, as at 154. The inspection IQI refers to a device with a target size real crack or a selected size artificial crack with known dimensions and controlled morphology. It may be made using a controlled fatigue crack growth process, electro-discharge machining process, laser machining process, or any other process that yields the desired morphology flaw. The width of the IQI flaw may be the same or larger than that of the target crack to be detected. The inspection IQI may be selected and/or qualified based upon the correlations, the predicted CNR SF, or both. The predetermined target flaw size may be the same as or different than the target flaw size from step 112 above.

The method 100 may also include determining one or more minimum qualified values for the one or more empirical IQI output parameters for the inspection IQI to provide detection of the predetermined target flaw size, as at 156.

The method 100 may also include performing a third (e.g., inspection) process, as at 160. The inspection process may be performed before, simultaneously with, or after the computer-simulated process, the empirical process, or both.

Figure 7:
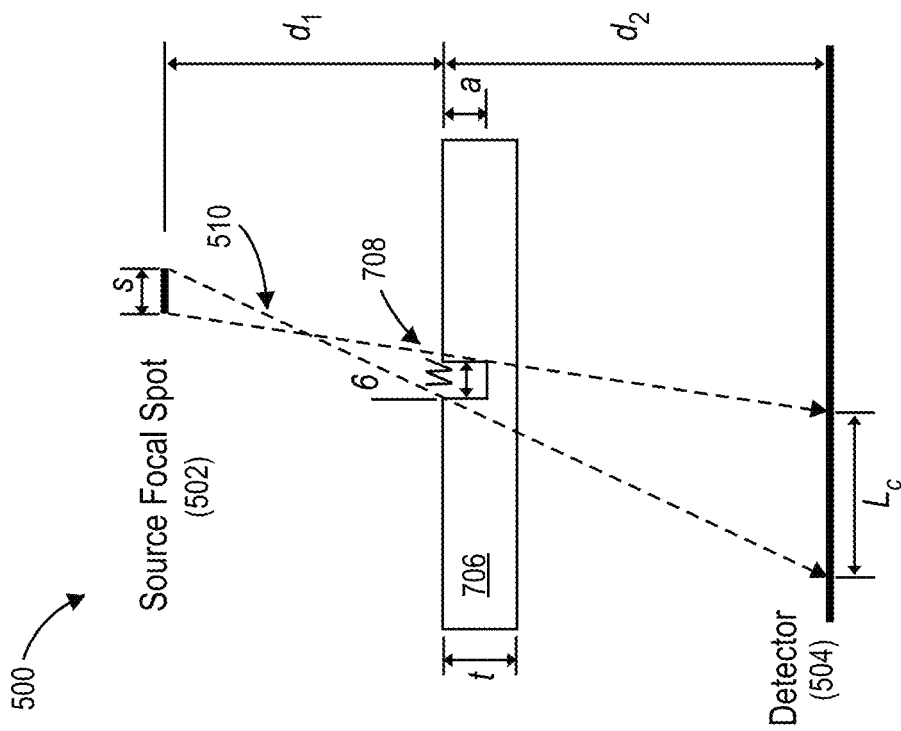
FIG. 7 illustrates a side view of the radiographic system in the selected set-up performing third (e.g., inspection) tests, according to an embodiment.

The inspection process may include selecting the qualified inspection IQI for the predetermined target flaw size, as at 162. The inspection process may also include performing an inspection test on the qualified inspection IQI using the radiographic inspection system 500 in the selected set-up, as at 164. FIG. 7 illustrates a side view of the radiographic system 500 in the selected set-up, according to an embodiment. In the selected set-up, the qualified inspection IQI 706 may be positioned between the radiation source 502 and the detector 504. During the inspection test(s), the radiation source 502 transmits radiation rays 510 that pass through the qualified inspection IQI 706 to the detector 504, which records a detected image. The detected image(s) may correspond to characteristics of the qualified inspection IQI 706 and any cracks or flaws 708 therein.

Referring to FIGS. 2A, 2B, 5A, 5B, and 7, in the selected set-up, one or more of the following input parameters may be the same:
- the thickness t of the part 206, 208, 506, 508, 706;
- the distance d1 between the source 202, 502 and the part 206A, 206B, 506A, 506B, 706;
- the distance d2 between the part 206A, 206B, 506A, 506B, 706 and the detector 204, 504;
- the single wall (shown) or double wall (not shown) geometry;
- the depth a of the simulated crack 208A, the simulated crack-like flaw 208B, the real crack specimen 508A, the crack-like flaw 508B, and the crack/flaw 708;
- the width w of the simulated crack 208A, the simulated crack-like flaw 208B, the real crack specimen 508A, the crack-like flaw 508B, and the crack/flaw 708;
- the x-ray angle $\beta$ with the crack plane; and/or the focal spot size s of the source 202, 502;

The inspection process may also include determining one or more inspection output parameters, as at 166. The inspection output parameters may be based upon the inspection test(s). In one embodiment, the inspection output parameters may include an inspection CNR, an inspection indication aspect ratio, an inspection resolution ratio, or a combination thereof.

The inspection process may also include verifying that the one or more inspection output parameters meet or exceed (e.g., are greater than or equal to) the minimum qualified values, as at 168. This may qualify the radiographic inspection system 500 in the selected set-up.

Figure 8:
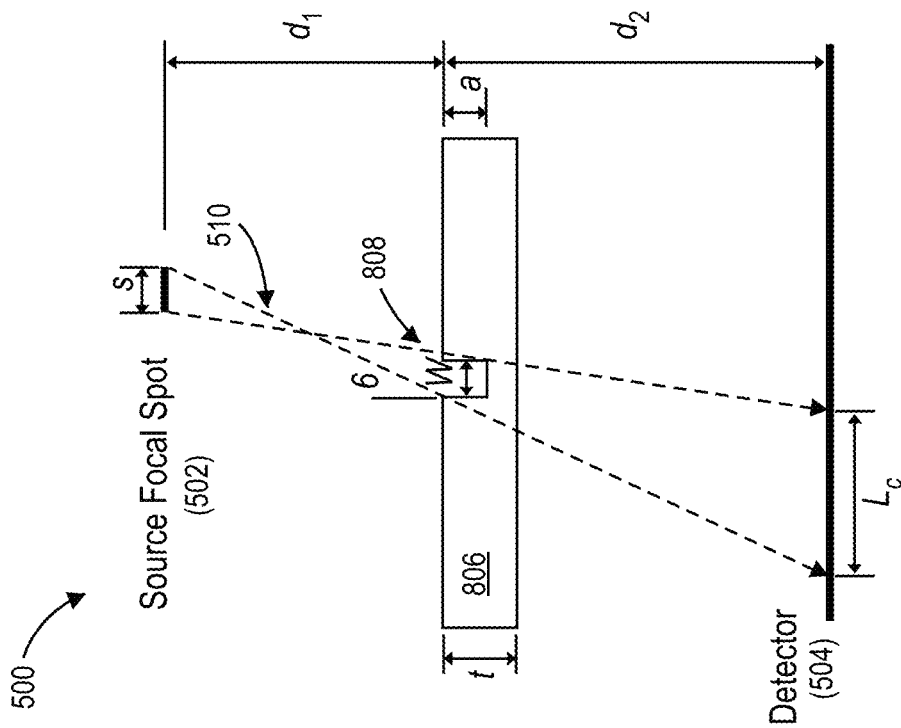
FIG. 8 illustrates a side view of the radiographic system in the selected set-up inspecting a component part to detect one or more cracks or flaws therein, according to an embodiment.

The method 100 may also include inspecting a component part using the qualified radiographic inspection system in the selected set-up, as at 170. This may be done to detect one or more cracks or flaws with greater than or equal to the predetermined target flaw size. FIG. 8 illustrates a side view of the radiographic system 500 in the selected set-up, according to an embodiment. In the selected set-up, the component part 806 may be positioned between the radiation source 502 and the detector 504. During the inspection, the radiation source 502 transmits radiation rays 510 that pass through the component part 806 to the detector 504, which records a detected image. The detected image(s) may correspond to characteristics of the component part 806 including any cracks or flaws 808 therein. If the cracks or flaws 808 are detected in the component part 806, the component part 806 may be repaired or discarded.

Figure 9:
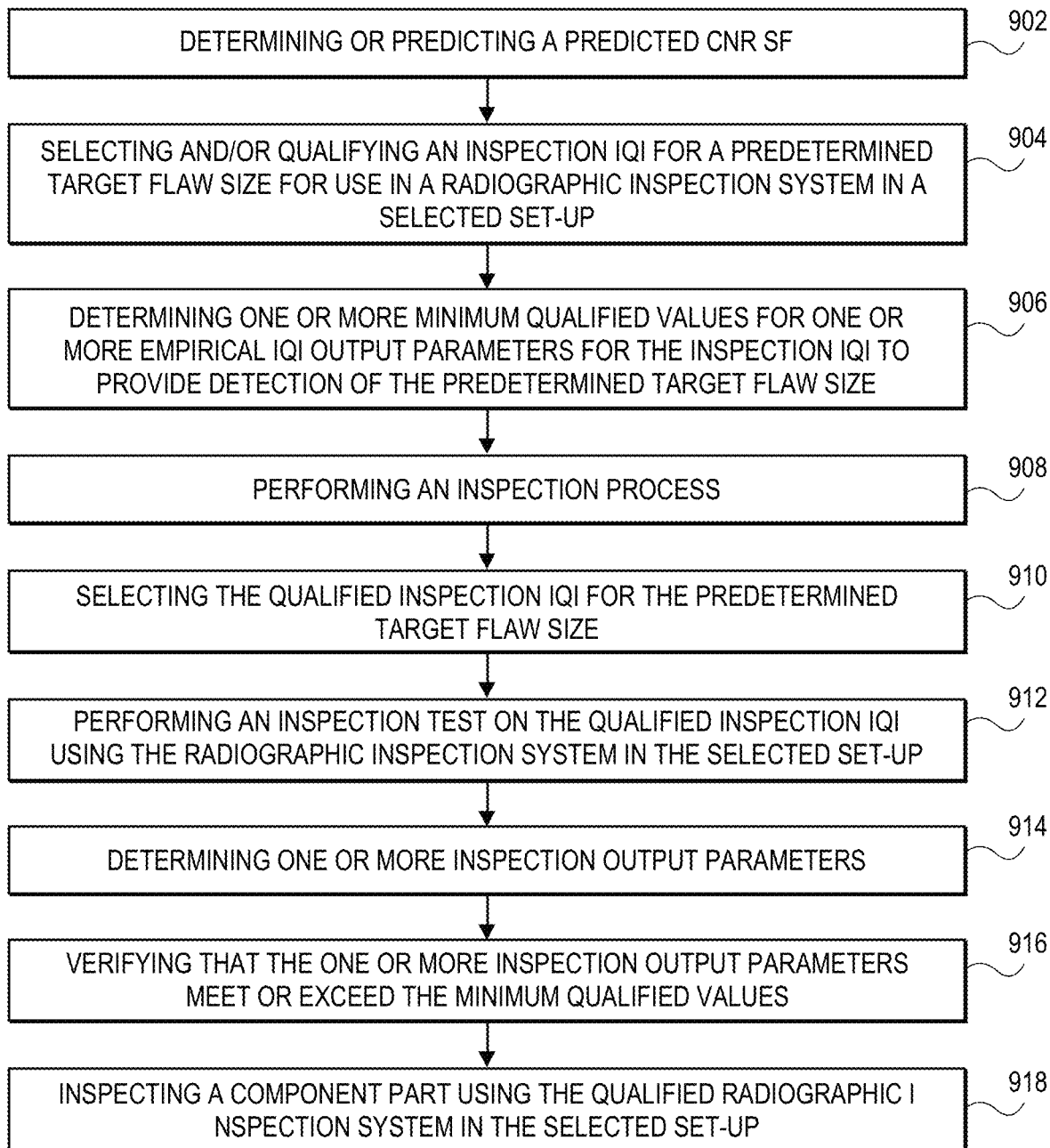
FIG. 9 illustrates a flowchart of another method for qualifying a radiographic inspection system in a selected set-up to make a crack detectability determination, according to an embodiment.

FIG. 9 illustrates a flowchart of another method 900 for qualifying a radiographic inspection system in a selected set-up to make a crack detectability determination, according to an embodiment. An illustrative order of the method 900 is provided below; however, one or more steps of the method 900 may be performed in a different order, split into sub-steps, combined, repeated, or omitted.

The method 900 may include determining or predicting a predicted CNR SF, as at 902. The predicted CNR SF may be used for crack detection. The predicted CNR SF may be based upon a plurality of correlations.

The method 900 may also include selecting and/or qualifying an inspection IQI for a predetermined target flaw size for use in the radiographic inspection system in the selected set-up, as at 904. The inspection IQI refers to a device with a target size real crack or a selected size artificial crack with known dimensions and controlled morphology. It may be made using a controlled fatigue crack growth process, electro-discharge machining process, laser machining process, or any other process that yields the desired morphology flaw. The width of the IQI flaw may be the same or larger than that of the target crack to be detected. The inspection IQI may be selected and/or qualified based upon the correlations, the predicted CNR SF, or both. The predetermined target flaw size may be the same as or different than the target flaw size from step 112 above.

The method 900 may also include determining one or more minimum qualified values for the one or more empirical IQI output parameters for the inspection IQI to provide detection of the predetermined target flaw size, as at 906.

The method 100 may also include performing an inspection process, as at 908. The inspection process may include selecting the qualified inspection IQI for the predetermined target flaw size, as at 910. The inspection process may also include performing an inspection test on the qualified inspection IQI using the radiographic inspection system 500 in the selected set-up, as at 912. As mentioned above, an example of this is shown in FIG. 7.

The inspection process may also include determining one or more inspection output parameters, as at 914. The inspection output parameters may be based upon the inspection test(s). In one embodiment, the inspection output parameters may include an inspection CNR, an inspection indication aspect ratio, an inspection resolution ratio, or a combination thereof.

The inspection process may also include verifying that the one or more inspection output parameters meet or exceed (e.g., are greater than or equal to) the minimum qualified values, as at 916. This may qualify the radiographic inspection system 500 in the selected set-up.

The method 900 may also include inspecting a component part using the qualified radiographic inspection system in the selected set-up, as at 918. This may be done to detect one or more cracks or flaws with greater than or equal to the predetermined target flaw size. As mentioned above, an example of this is shown in FIG. 8.

Figure 10A:
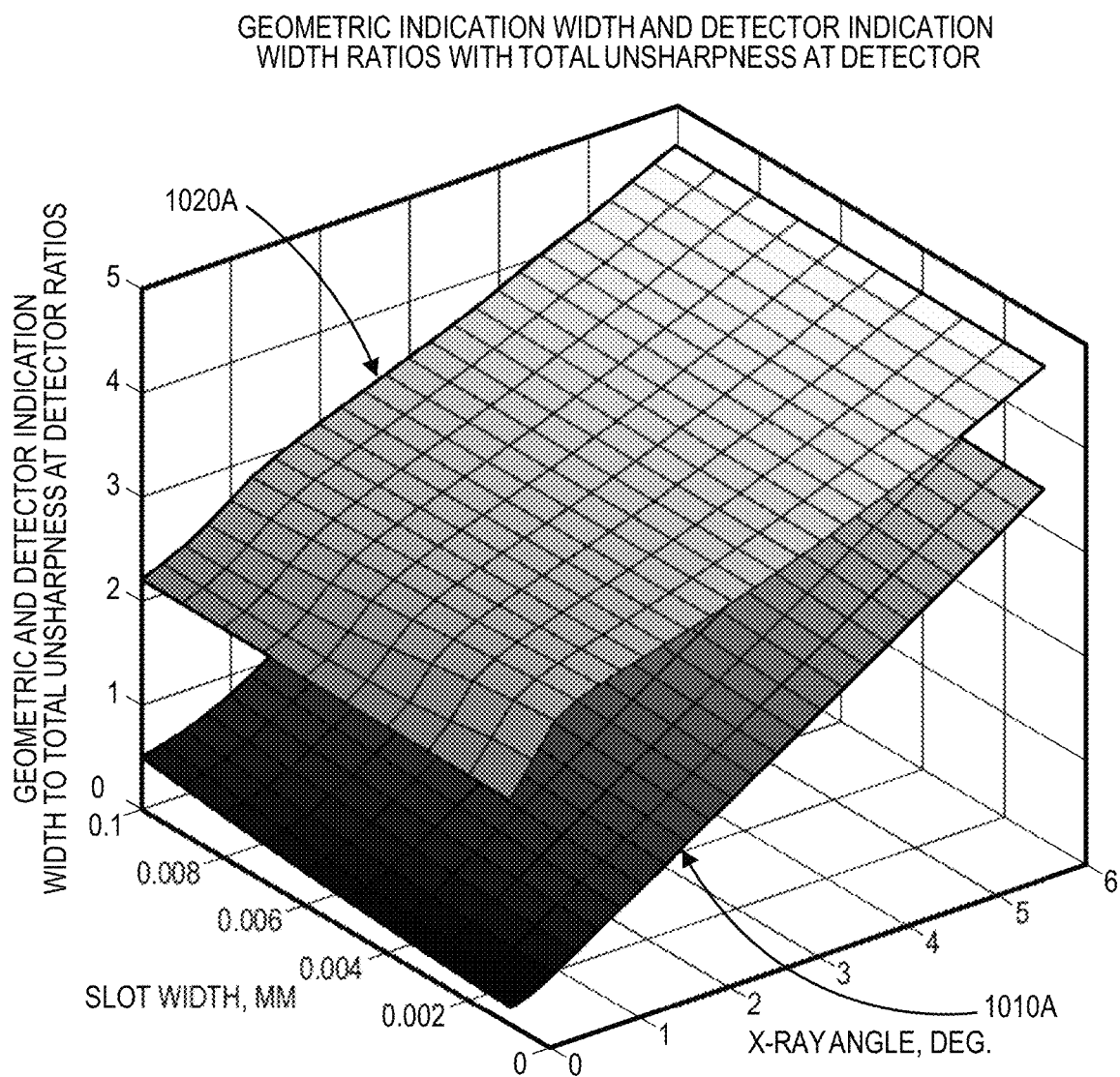
FIGS. 10A and 10B illustrate graphs showing a simulated resolution ratio and CNR maps as functions of slot width and x-ray angle, according to an embodiment.
Figure 10B:
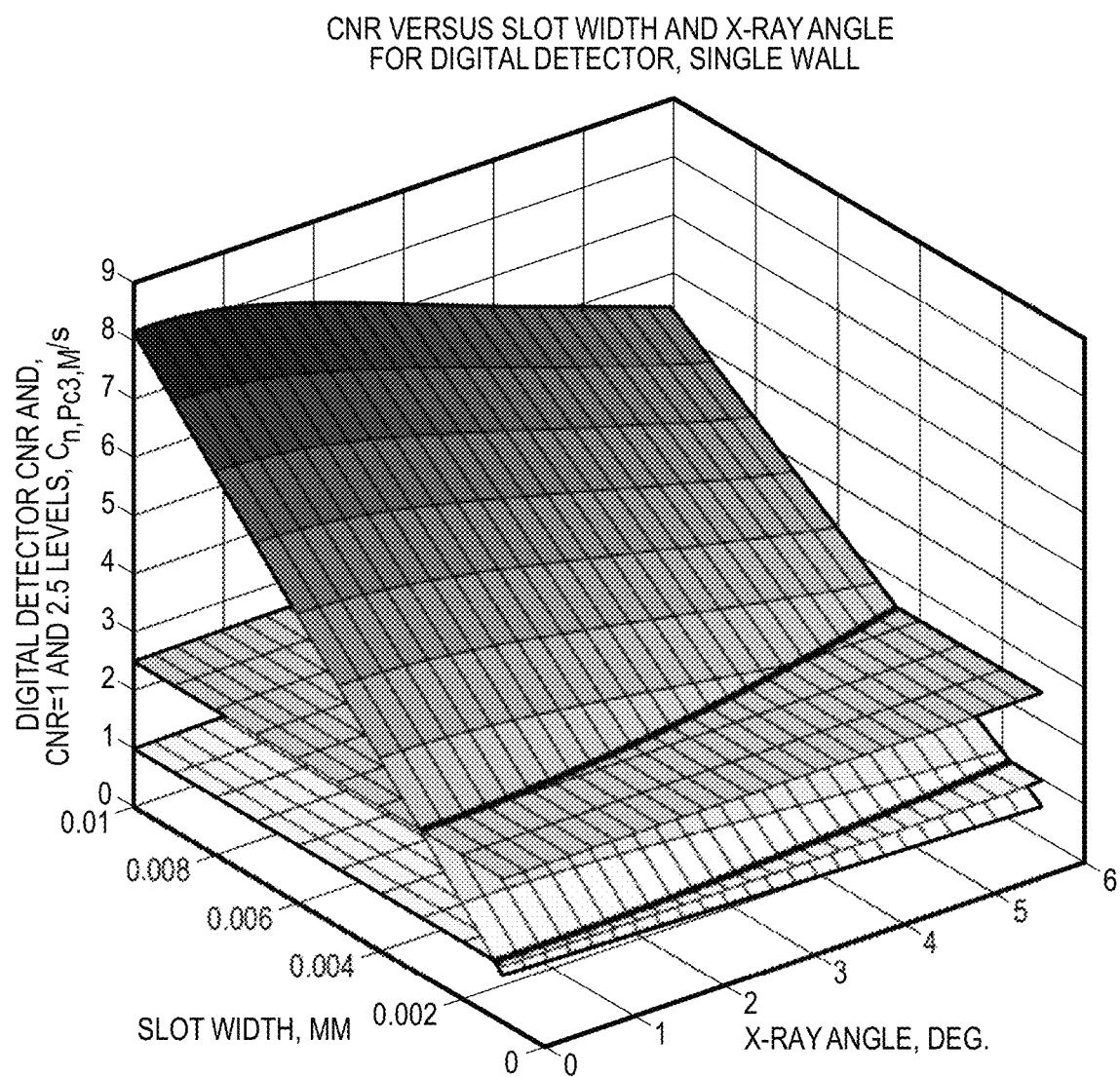

FIGS. 10A and 10B illustrate graphs showing a simulated CNR and resolution ratio maps as a function of slot width and x-ray angle, according to an embodiment. More particularly, FIG. 10A illustrates the geometric indication width ratio and the detector indication width ratio with total unsharpness at the detector. In FIG. 10A, the lower indication 1010A represents the geometric indication width ratio, and the upper indication 1020A represents the detector indication width ratio. In the example of FIG. 10A:

source size=0.400 mm
detector system basic resolution (SRb)=0.010 mm
part thickness=0.71 mm
slot depth=0.50 mm
a/t=0.71
magnification=1.01
source to part distance=600 mm FIG. 10B illustrates CNR versus slot width and x-ray angle for the detector in a single wall embodiment. In the example of FIG. 10B:

source size=0.400 mm
detector system basic resolution (SRb)=0.010 mm
thickness sensitivity Δa/t=0.040
part thickness=0.71 mm
slot depth=0.50 mm
a/t=0.71
magnification=1.01
source to part distance=600 mm In one embodiment, the calibration flaw length and/or depth may be less than or equal to the target size crack. The calibration flaw gap may be selected to be as small as practical but is likely to be larger than that of the target crack (e.g., by at least an order of magnitude). The gap size for the target crack may be known. The resolution ratios and the CNR may change monotonically as a function of the gap, as shown in FIGS. 10A and 10B, within the gap range defined by the crack gap on the low end and the calibration flaw gap on the high end.

Figure 11:
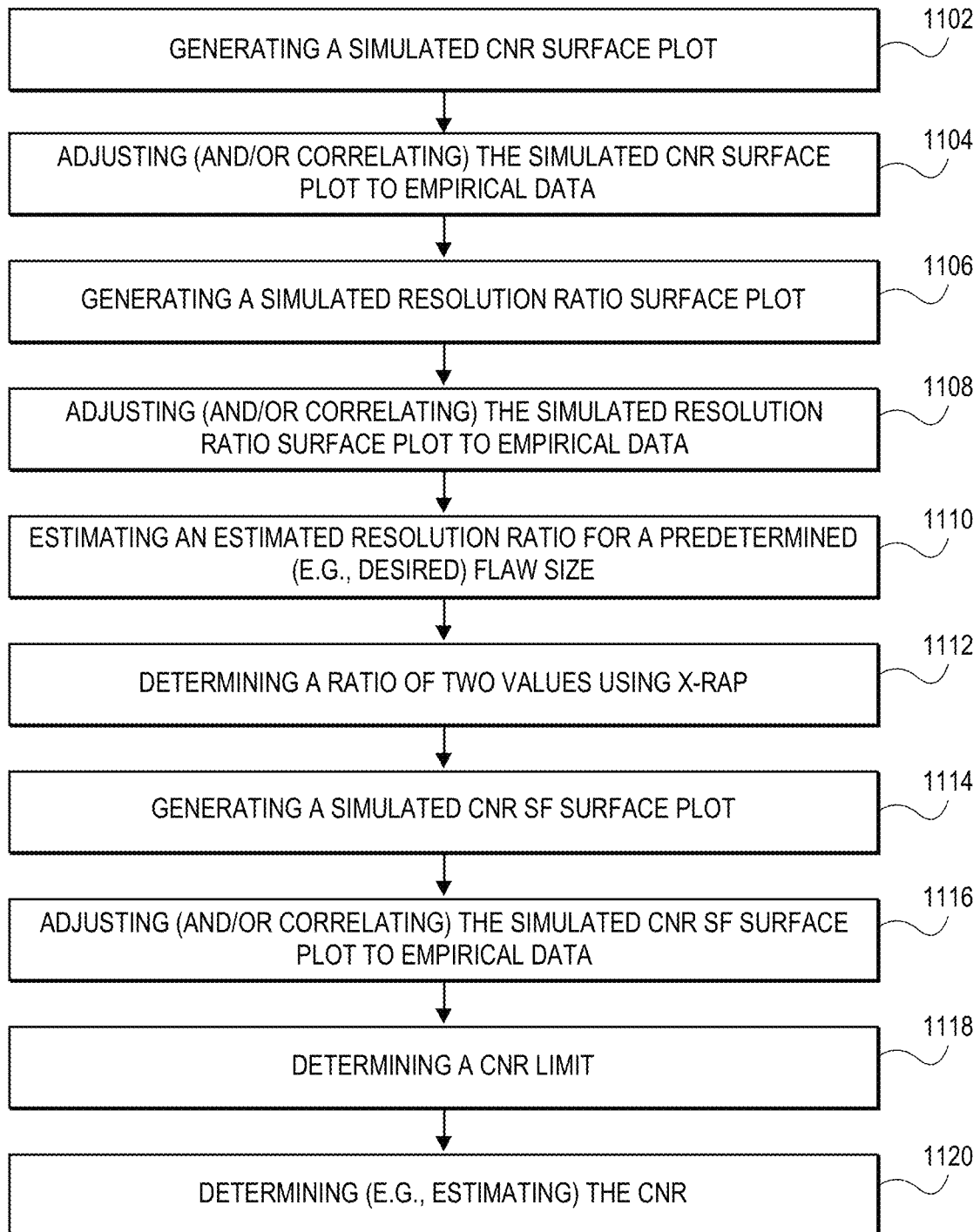
FIG. 11 illustrates a flowchart of another method for qualifying a radiographic inspection system in a selected set-up to make a crack detectability determination, according to an embodiment.

FIG. 11 illustrates a flowchart of another method 1100 for qualifying a radiographic inspection system in a selected set-up to make a crack detectability determination, according to an embodiment. An illustrative order of the method 1100 is provided below; however, one or more steps of the method 1100 may be performed in a different order, split into sub-steps, combined, repeated, or omitted.

The method 1100 may be used to qualify an x-ray detection of a cracklike target flaw. As described below, the method 1100 may include estimating the CNR and $CNR_{lim}$ for a given flaw in a given set-up. Simulation data and/or empirical data may be used. The empirical data may be taken on the same and/or close to the target size flaw as well as on the same and/or close to the calibration size flaw. The calibration size flaw may be substantially identical to the target size flaw, except the gap or width dimension for the target size flaw may be smaller than that for the calibration flaw. The steps in the method 1100 may be independently repeated for the target size flaw and/or the calibration size flaw. In the example below, resolution ratio 2 is selected, but other resolution ratios may also or instead be selected. The steps below are for the example of a target size flaw.

Figure 12A:
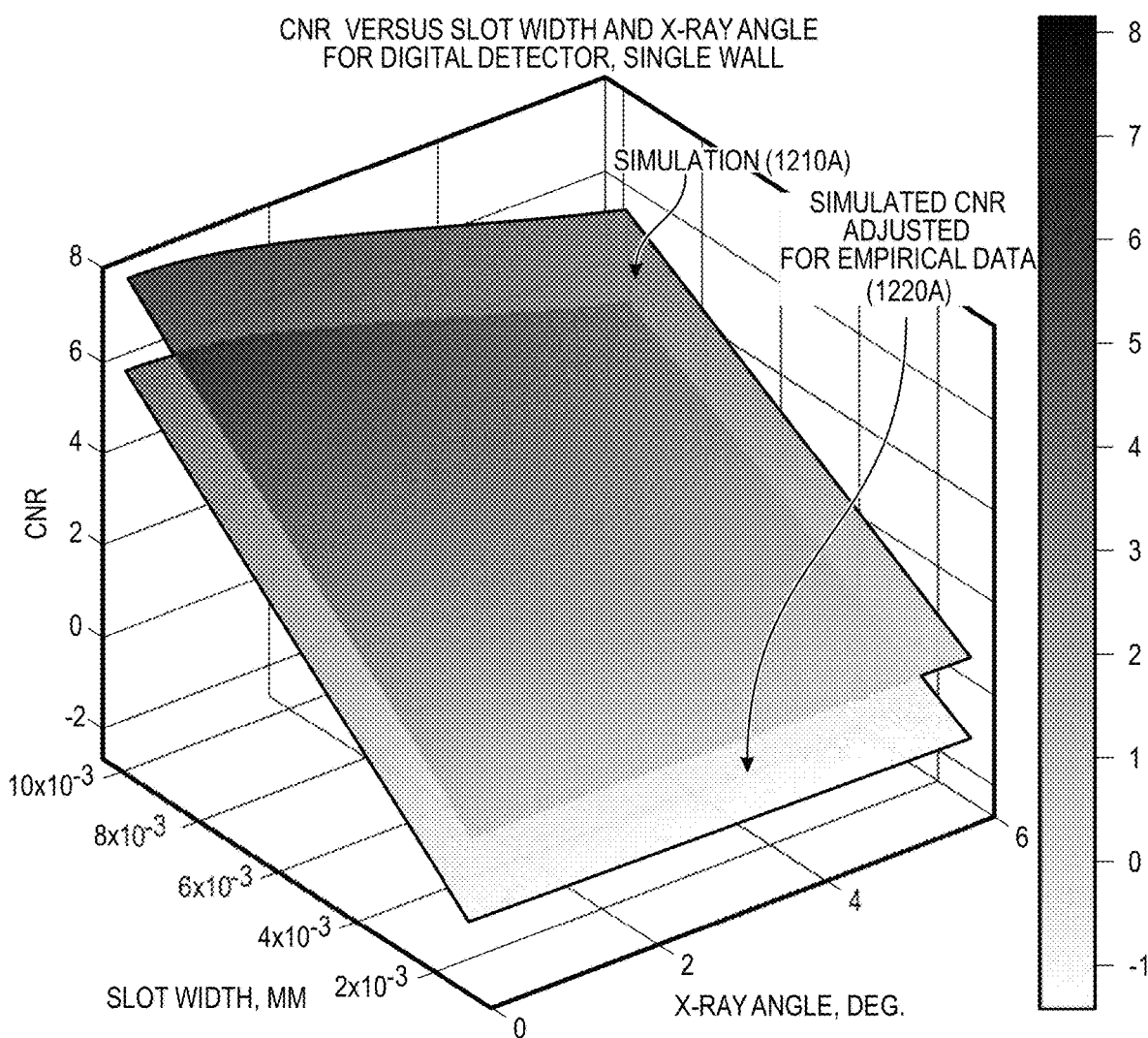
FIGS. 12A and 12B illustrate simulated CNR surface plots, according to an embodiment.
Figure 12B:
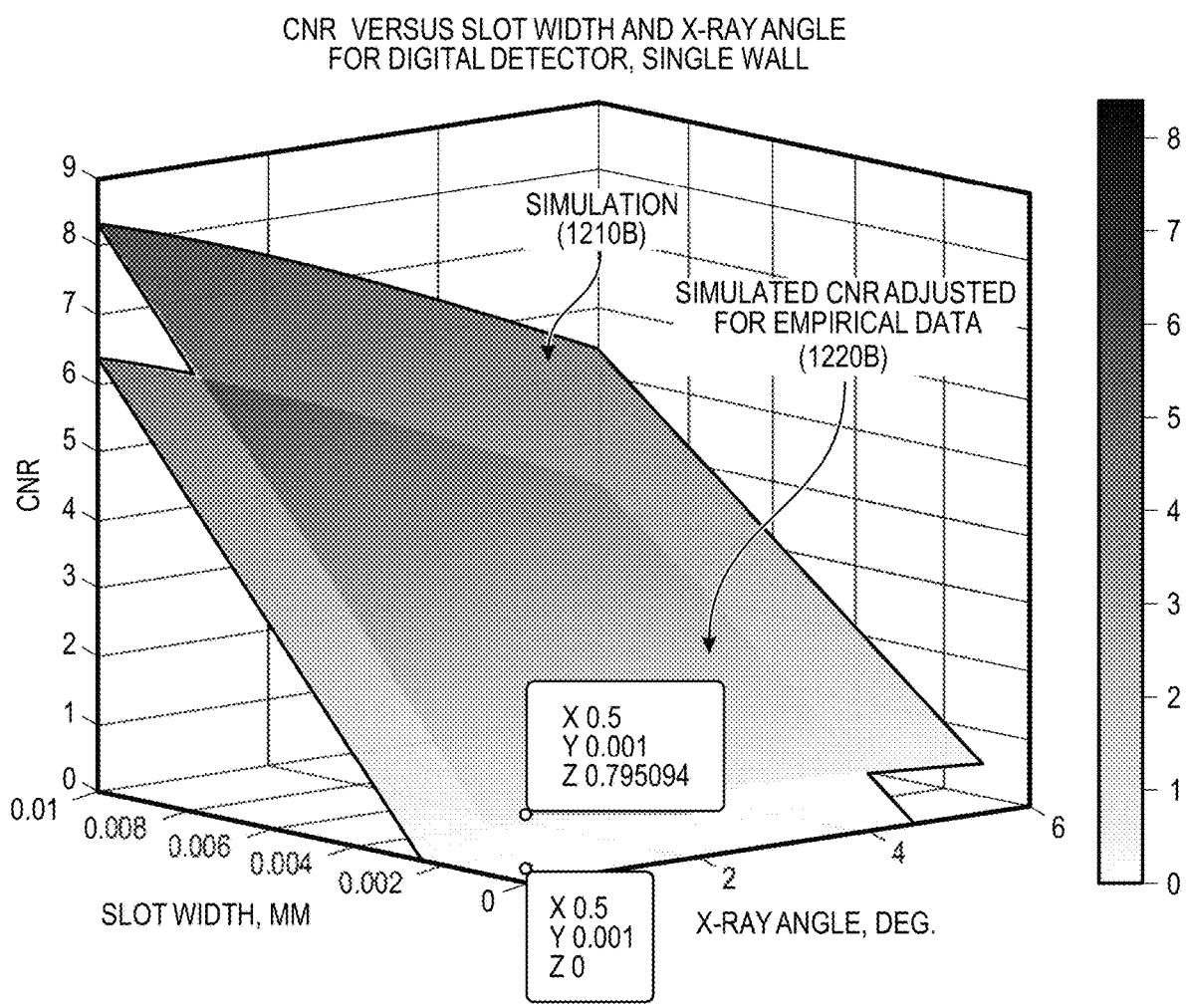

The method 1100 may include generating a simulated CNR surface plot, as at 1102. A surface equation may be determined for (e.g., fit to) the simulated CNR surface plot. The surface may have data that is applicable to the calibration size flaw. FIGS. 12A and 12B illustrate examples of CNR surface plots 1210A, 1210B, according to an embodiment.

The method 1100 may also include adjusting (and/or correlating) the simulated CNR surface plot 1210A, 1210B to empirical data, as at 1104. If a predetermined (e.g., sufficient) amount of data exists, then the empirical CNR surface plot may be generated. FIGS. 12A and 12B also illustrate examples of adjusted simulated CNR surface plots 1220A, 1220B. More particularly, FIG. 12A shows the simulated CNR surface plot 1210A adjusted for empirical data to yield 1220A, and FIG. 12B uses surface plot fitting to the simulation data to yield 1210B and surface plot fitting adjusted for empirical data to yield 1220B.

Two data points are illustrated with the same slot width and x-ray angle. The upper datapoint (plot 1210A, 1210B) is for the simulated CNR. The lower datapoint (plot 1220A, 1220B) is for the simulated CNR adjusted for empirical data. The adjustment may be done by shifting the surface so that the empirical data from the flaws close to the target size flaws are correlated.

Figure 13A:
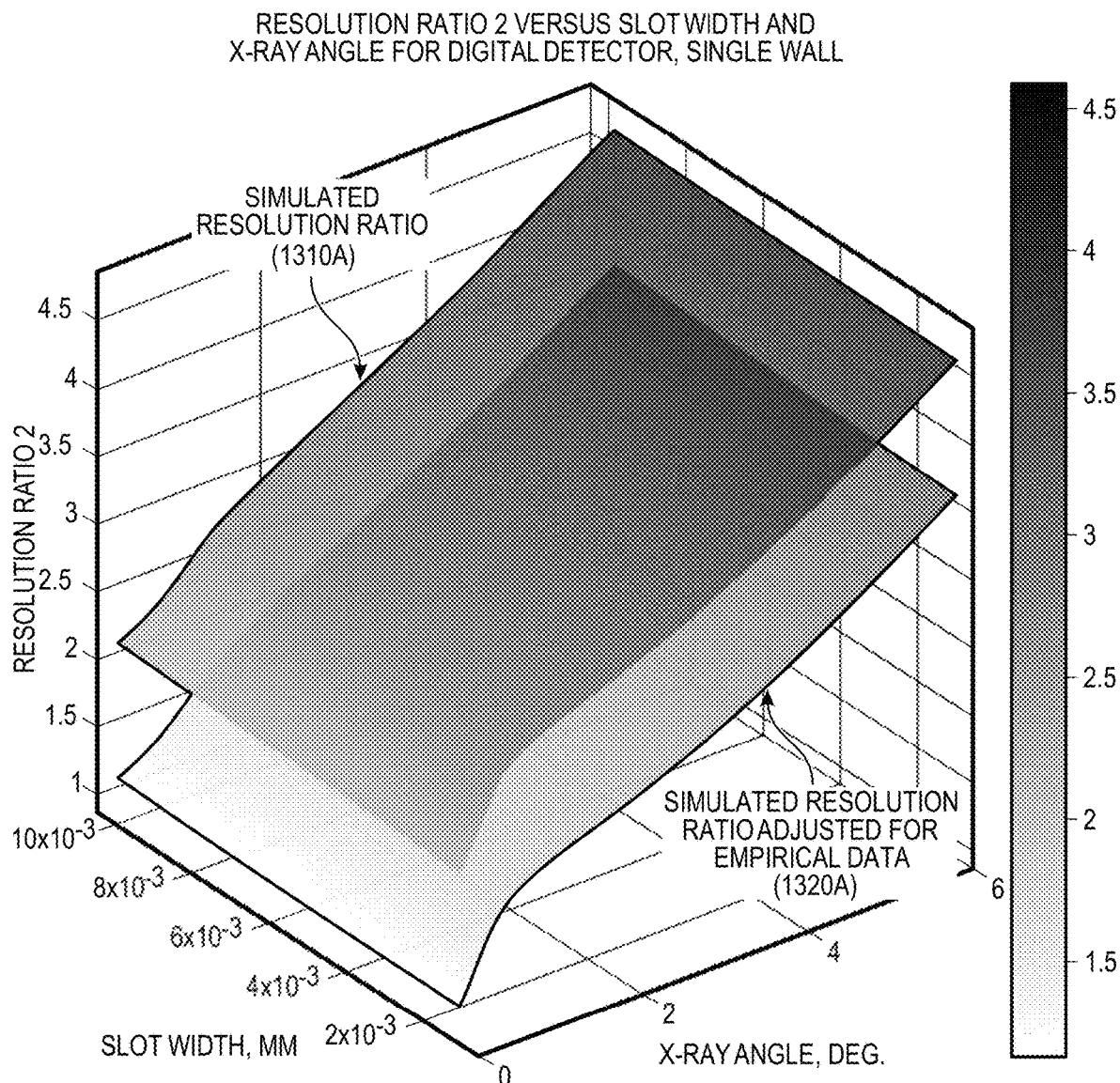
FIGS. 13A and 13B illustrate simulated resolution ratio surface plots, according to an embodiment.
Figure 13B:
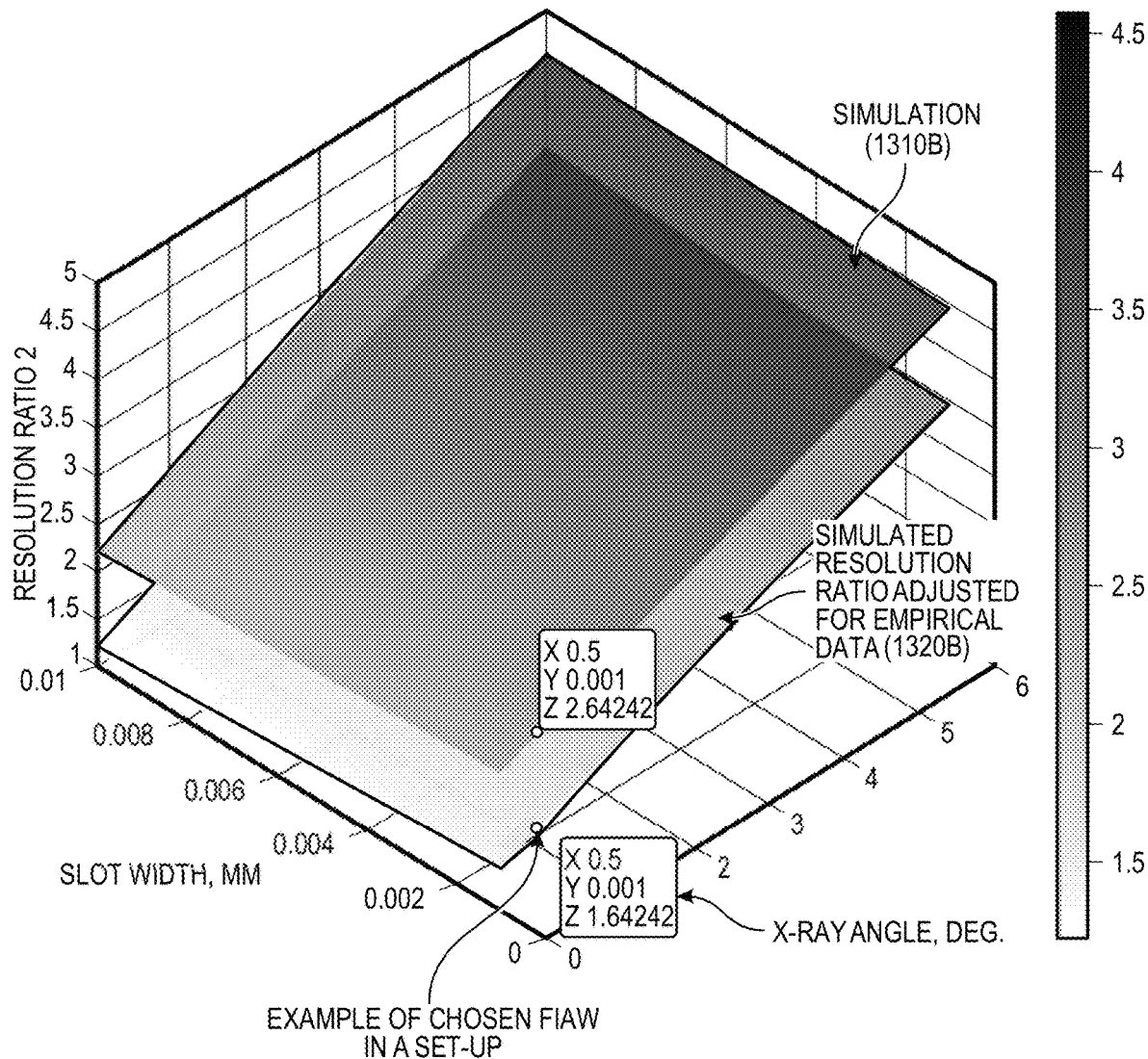

The method 1100 may also include generating a simulated resolution ratio surface plot, as at 1106. A surface equation may be fit to the simulated resolution ratio surface plot. FIGS. 13A and 13B illustrate simulated resolution ratio surface plots 1310A, 1310B, according to an embodiment.

The method 1100 may also include adjusting (and/or correlating) the simulated resolution ratio surface plot 1310A, 1310B to empirical data, as at 1108. If a predetermined (e.g., sufficient) amount of data exists, then the empirical resolution ratio surface plot may be generated. FIGS. 13A and 13B also illustrate examples of adjusted simulated resolution ratio surface plots 1320A, 1320B. More particularly, FIG. 13A shows the simulated resolution ratio surface plot 1310A adjusted for empirical data to yield 1320A, and FIG. 13B uses surface plot fitting to the simulation data to yield 1310B and surface plot fitting adjusted for empirical data to yield 1320B.

The method 1100 may also include estimating an estimated resolution ratio for a predetermined (e.g., desired) flaw size, as at 1110. The estimated resolution ratio may be estimated based at least partially upon the adjusted resolution ratio surface plot 1320A, 1320B. The estimated resolution ratio may be estimated using the same set-up as was used in one or more of steps 1102-1108.

The method 1100 may also include determining a ratio of two values, as at 1112. The ratio may be determined using x-ray application (X-RAP). The ratio may be determined based at least partially upon the simulation data and/or empirical data. The ratio may also be determined based at least partially upon the plots from steps 1102-1108. The first value may be a first ratio of the indication length to the indication width based upon the experimental or empirical data. The second value may be a second ratio of the indication length to the indication width based upon the simulation data. In one example, determining the ratio may include:

$$\hat{F}_{R_{\frac{L}{W},exp,sim}} = \frac{R_{L/W,exp}}{R_{L/W,sim}} \qquad \text{Equation 1}$$

Where $\hat{F}$ refers to a function that is estimated (e.g., not measured directly), R refers to a ratio, L refers to the indication length, W refers to the indication width, exp refers to experimental (e.g., empirical), and sim refers to simulation.

An estimated length/width ratio may also be determined using $R_{L/W,exp}$ for a selected flaw size in a set-up using:

$$R_{L/W,exp} = \hat{F}_{R_{\frac{L}{W},exp,sim}} R_{L/W,sim} \qquad \text{Equation 2}$$

Figure 14A:
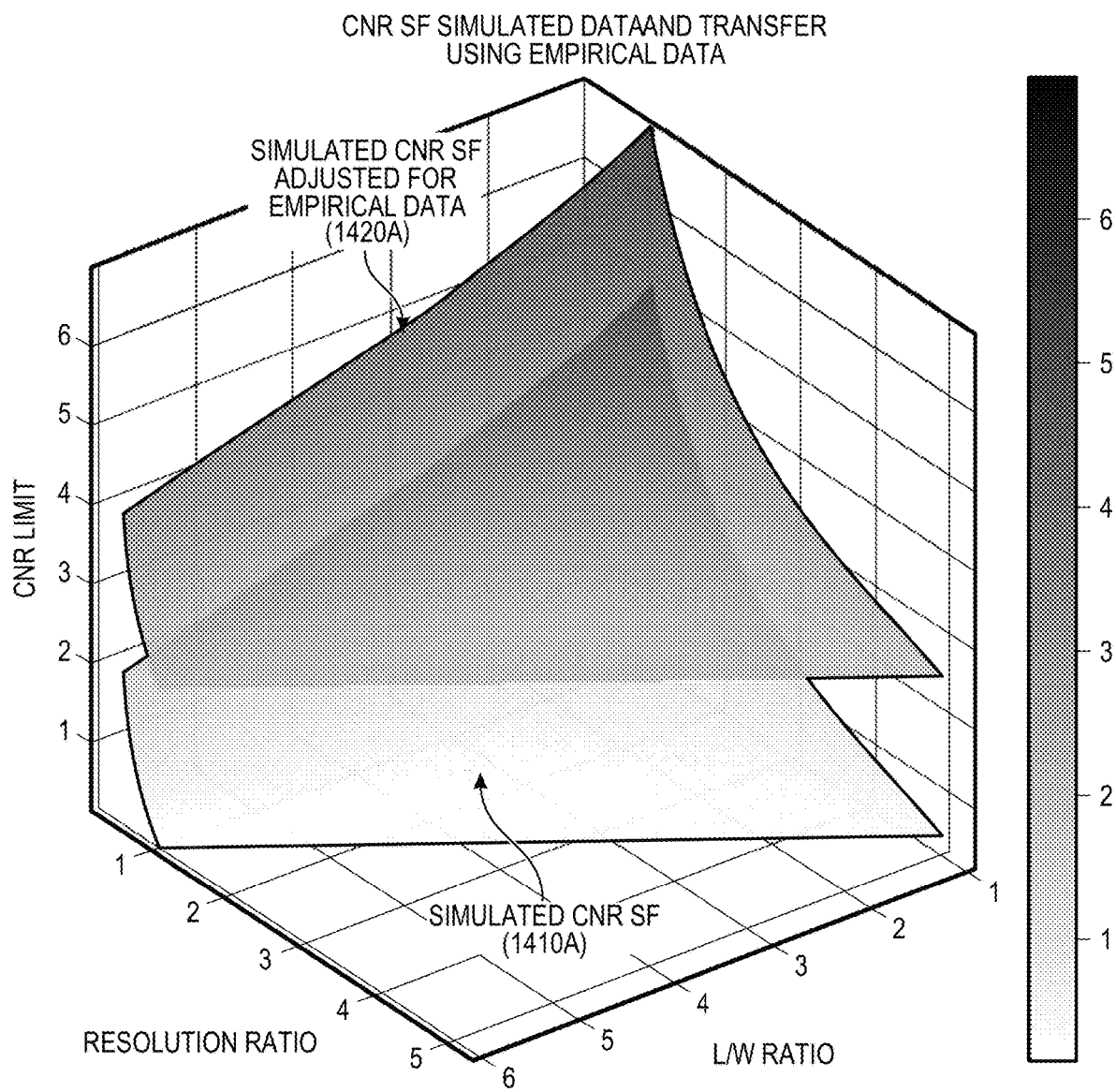
FIGS. 14A and 14B illustrate simulated CNR SF surface plots, according to an embodiment.
Figure 14B:
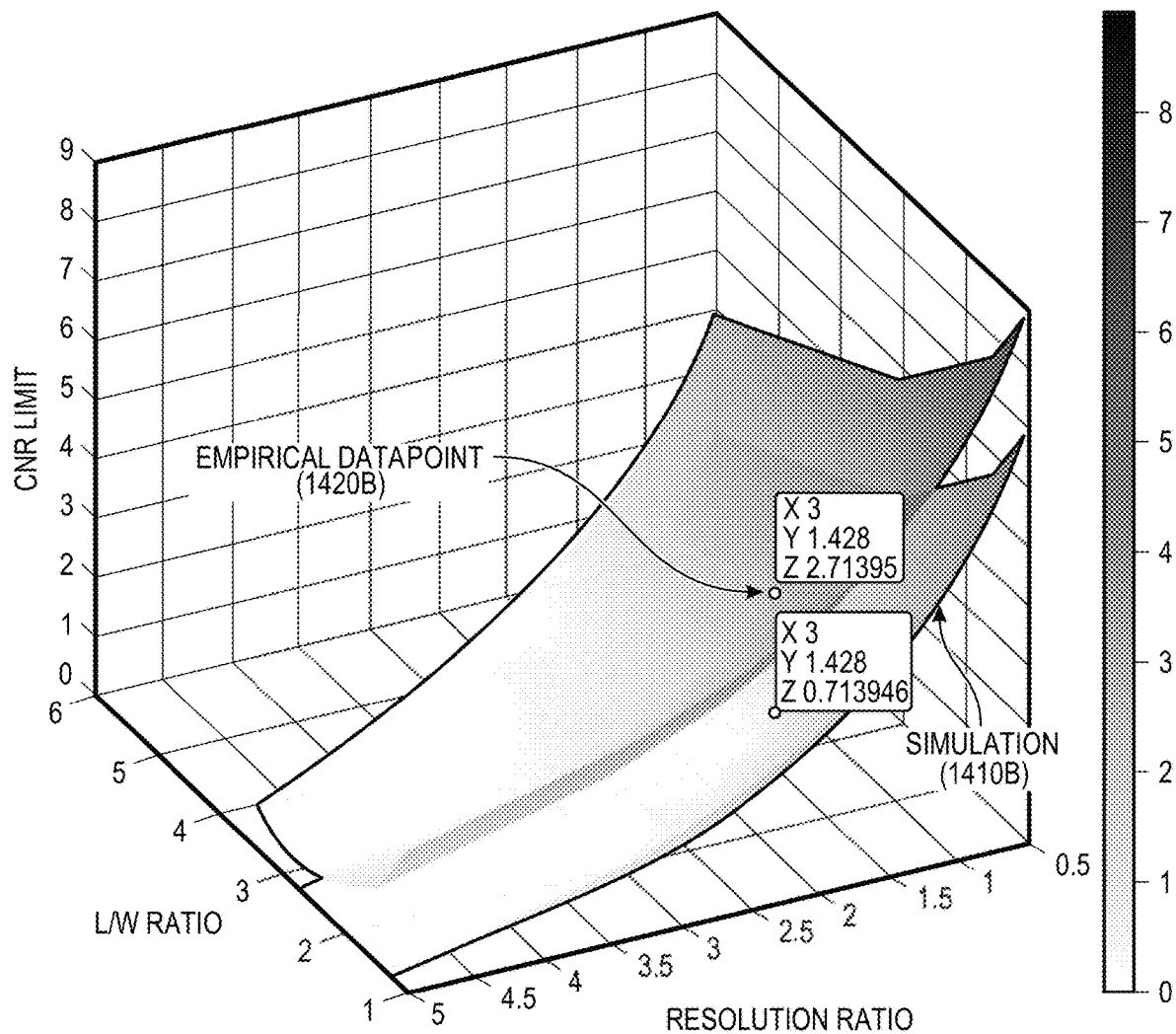

The method 1100 may also include generating a simulated CNR SF surface plot, as at 1114. A surface equation may be fit to the simulated CNR SF surface plot. FIGS. 14A and 14B illustrate simulated CNR SF surface plots 1410A, 1410B, according to an embodiment.

The method 1100 may also include adjusting (and/or correlating) the simulated CNR SF surface plot 1410A, 1410B to empirical data, as at 1116. If a predetermined (e.g., sufficient) amount of data exists, then the empirical CNR SF surface plot may be generated. FIGS. 14A and 14B also illustrate examples of adjusted simulated CNR SF surface plots 1420A, 1420B. More particularly, FIG. 14A shows the simulated CNR SF surface plot 1410A adjusted for empirical data to yield 1420A, and FIG. 14B uses surface plot fitting to the simulation data to yield 1410B and surface plot fitting adjusted for empirical data to yield 1420B.

The method 1100 may also include determining a CNR limit (also referred to herein as $CNR_{lim}$), as at 1118. The CNR limit may be determined based at least partially upon the estimated resolution ratio (from 1110), the estimated L/W indication ratio (from 1112), the CNR SF adjusted for empirical data (from 1116), or a combination thereof.

The method 1100 may also include determining (e.g., estimating) the CNR based at least partially upon the CNR surface plot 1420A, 1420B adjusted for empirical data (from 1116), as at 1120. The CNR may be estimated for the specific flaws size and set-up from the plots shown in FIGS. 12A and 12B. If the $CNR > CNR_{lim}$, then the flaw will be detected.

Once a set-up is selected such that $CNR > CNR_{lim}$ with a predetermined margin, then steps 1102-1120 may be repeated for the calibration flaw. A nominal CNR value, a resolution ratio value, and a L/W indication ratio value may be determined based upon the calibration flaw. Then, one or more limits may be set for verifying the set-up based at least partially upon measuring the CNR, resolution ratio, and L/W indication ratio. Then, these values may be compared with the set limits.

Method for Detecting a Target Flaw Using a Radiographic Inspection System

Figure 15:
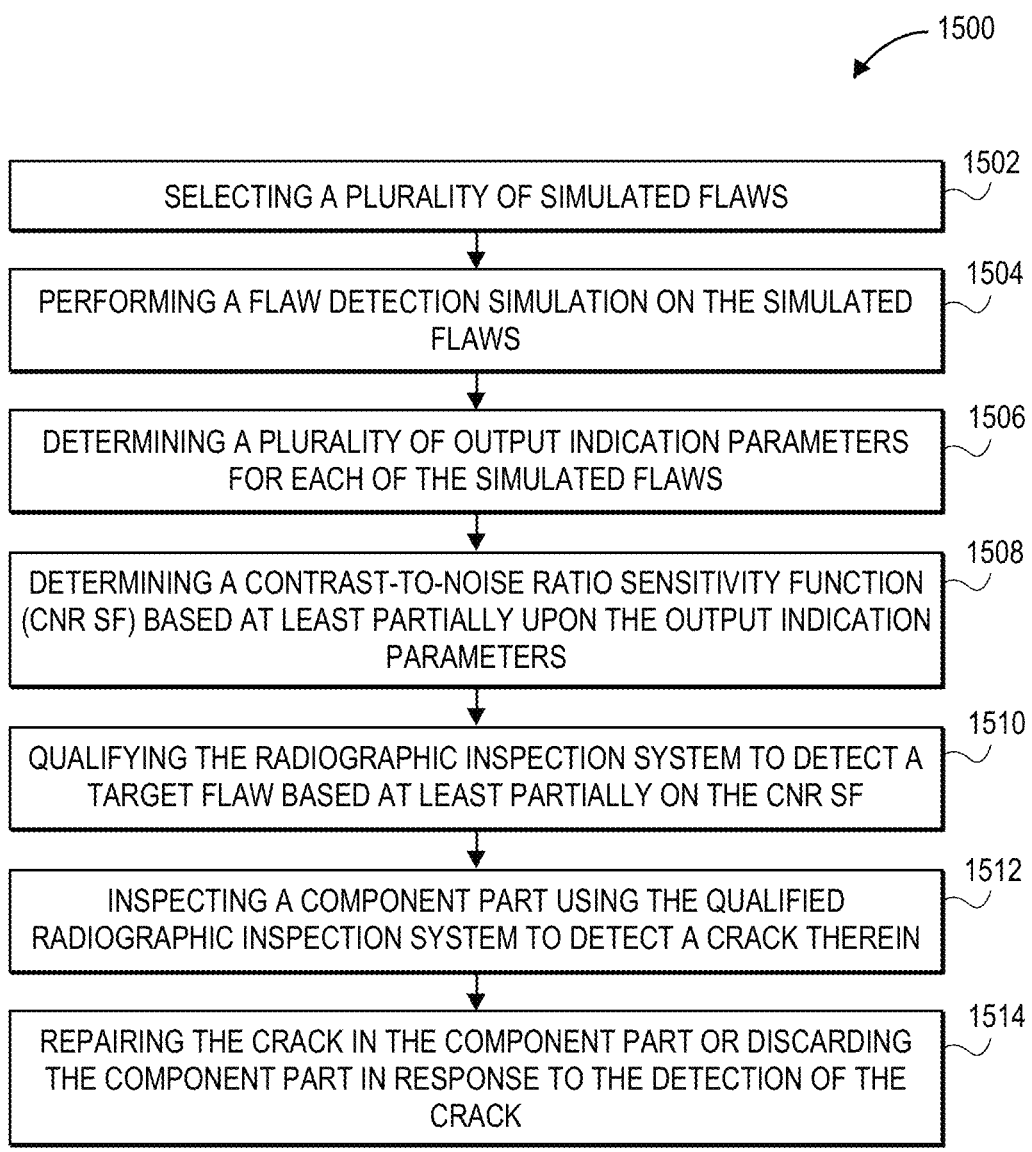
FIG. 15 illustrates a flowchart of another method for qualifying a radiographic inspection system in a selected set-up to make a crack detectability determination, according to an embodiment.

FIG. 15 illustrates a flowchart of another method 1500 for qualifying a radiographic inspection system 200, 500 (see FIGS. 2 and 5) in a selected set-up to make a crack detectability determination, according to an embodiment. An illustrative order of the method 1500 is provided below:

however, one or more steps of the method 1500 may be performed in a different order, split into sub-steps, combined, repeated, or omitted.

The method 1500 may include selecting one or more (i.e., a plurality of) simulated flaws, as at 1502. In one example, the simulated flaw refers to the crack-like flaw 208B (see FIGS. 2A and 2B) that is simulated using the computing system. Each of the simulated flaws has a (e.g., different) simulated flaw size. The simulated flaws may include a target flaw, a calibration flaw, or both. The target flaw refers to the crack-like flaw 208B having at least the target flaw size. The target flaw size is defined as the size of the flaw that needs to be detected reliably (i.e., with high POD/Conf (e.g., 90%/95%) and low POF (e.g., 1%). If target flaws are detected reliably, then larger flaws are also assumed to be detected reliably. The target flaw size is described by its flaw length, flaw depth, flaw width, or any combination thereof. For example, the target flaw size may depend at least partially upon the flaw width and flaw length but not the flaw depth. The calibration flaw refers to the crack-like flaw 208B (and/or a user-manufactured flaw for an image quality indicator (IQI)) having the calibration flaw size.

The method 1500 may also include performing a flaw detection simulation on the simulated flaws, as at 1504. The flaw detection simulation may include simulating the detection of the simulated flaws using the computing system.

The method 1500 may also include determining a plurality of output indication parameters for each of the simulated flaws, as at 1506. The output indication parameters may be determined based at least partially upon the flaw detection simulation. The output indication parameters may include a contrast-to-noise ratio (CNR), a resolution ratio, a length-to-width (L/W) indication ratio, a probability parameter, or a combination thereof. The L/W indication ratio refers to indication length divided by indication width. The probability parameter includes a probability of detection (POD), a probability of false positive (POF), or both for each of the simulated flaws. The probability parameter may be determined at least partially in response to performing the flaw detection simulation.

The method 1500 may also include determining a contrast-to-noise ratio sensitivity function (CNR SF) based at least partially upon the output indication parameters, as at 1508. The CNR SF may include a CNR range, a resolution ratio range, a L/W indication ratio range, a CNR value corresponding to the probability parameter threshold value, or a combination thereof. The CNR range refers to a range of values for the CNR (from the previous step). The resolution ratio range refers to a range of values for the resolution ratio (from the previous step). The L/W indication ratio range refers to a range of values for the L/W indication ratio (from the previous step). The probability parameter threshold value refers to the selected value (e.g., 90%/95% POD/confidence or 1%/95% POF/confidence).

In one embodiment, determining the CNR SF (at 1508) may also or instead include determining a first independent variable including a set of values for the resolution ratio range, determining a second independent variable including a set of values for the L/W indication ratio range, and determining a dependent variable including a set of values for the CNR range. A value of the dependent variable may correspond to the probability parameter threshold value for each simulated flaw. A range of the CNR SF values may then be plotted on a graph (see FIGS. 14A and 14B) based at least partially upon the first independent variable, the second independent variable, the dependent variable, or a combination thereof.

In another embodiment, determining the CNR SF (at 1508) may also or instead include generating a simulated 2D indication image (see FIGS. 3A-3D, 4A, and 4B) for each of the simulated flaws. One or more 2D-extended output parameters may then be determined or calculated based at least partially upon the simulated 2D indication image. The CNR SF may be determined based at least partially upon the one or more 2D-extended output parameters. The one or more 2D-extended output parameters may include a measured resolution ratio of an indication 310A-310D (see FIGS. 3A-3D), the L/W indication ratio, a number of resolution size pixels in the indication 310A, 310B, a measured CNR on a real indication 310A, 310B, the probability parameter, or a combination thereof.

Figure 16A:
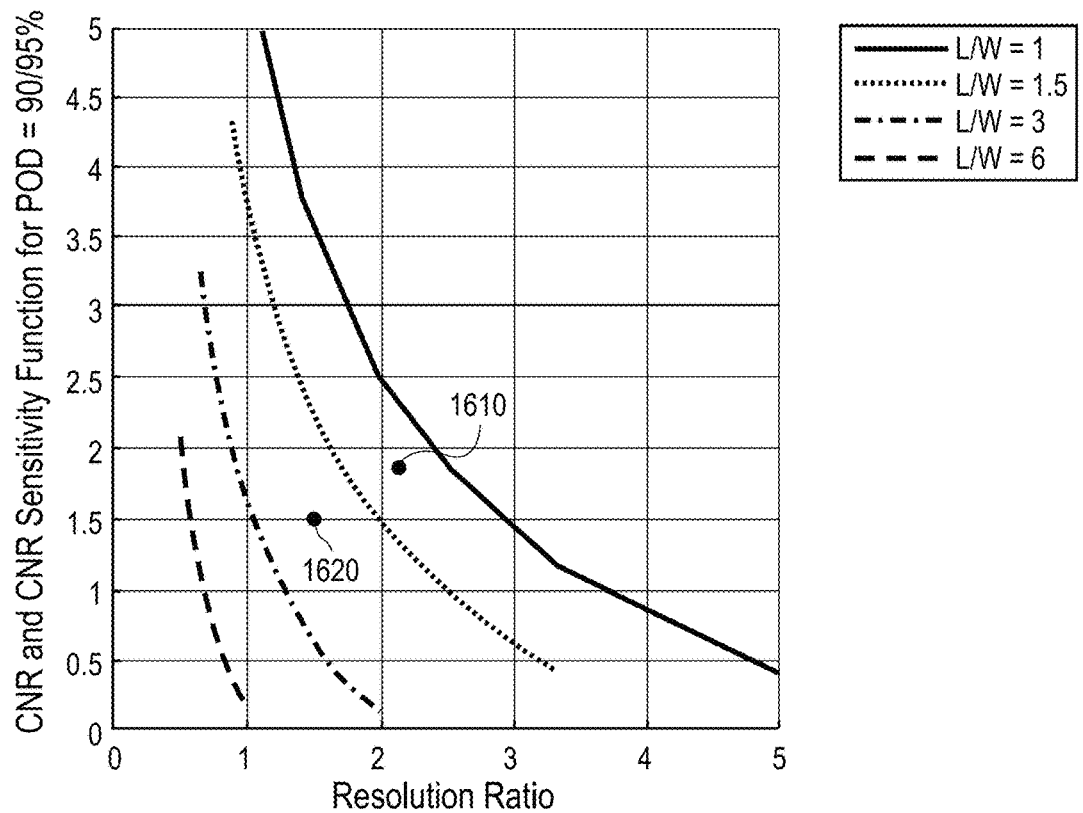
FIGS. 16A and 16B illustrate graphs showing CNR SF calculated for four indication aspect ratios, according to an embodiment.
Figure 16B:
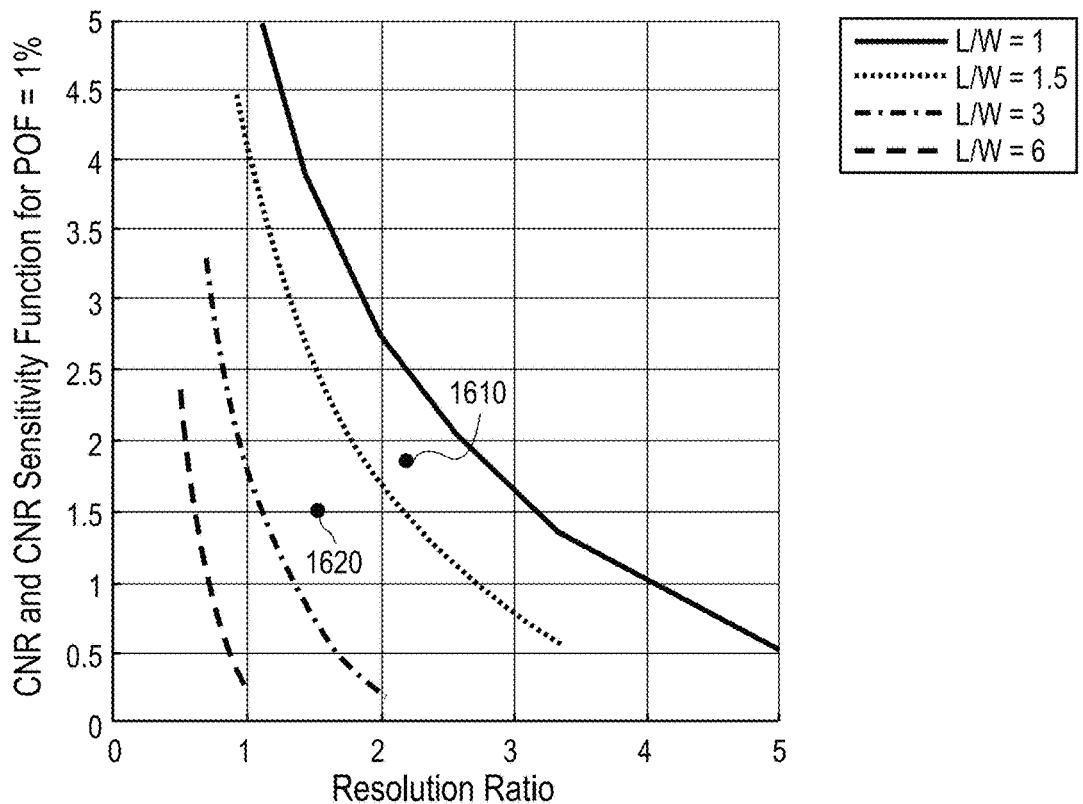

The method 1500 may also include qualifying a physical (e.g., not simulated and/or empirical) radiographic inspection system 200, 500 in the selected set-up (see FIGS. 7 and 8) to detect the target flaw 208B (see FIGS. 2A and 2B), as at 1510. The qualification may include determining that a predicted CNR value of the target flaw 208B is greater than or equal to a corresponding CNR value of the CNR SF, as illustrated in FIGS. 16A and 16B, which are described below. The predicted output parameter value may be based on first measuring the output parameters on the IQI calibration flaw of a qualified inspection IQI (see, for example, the qualified inspection IQI 706 shown in FIG. 7 and the embodiment described above), and then correlating those to determine the predicted output parameters values of the target flaw 208B. The CNR value for the target flaw 208B may be determined using simulation and/or using correlation(s) (see FIG. 6C) to empirical data. The corresponding CNR value of the CNR SF may be selected by using values of resolution ratio and L/W indication ratio of the target flaw 208B.

In block 1510, the radiographic inspection system in the selected set-up to detect a target flaw at a minimum POD/Conf.=90%/95% is qualified by using the CNR SF determined in step 1508 of FIG. 15. More specifically, FIGS. 16A and 16B provide further explanation of step 1510. FIGS. 16A and 16B illustrate graphs showing CNR SF calculated for four indication aspect ratios, according to an embodiment. More particularly, FIG. 16A illustrates a graph showing a computed CNR SF for POD/Conf.=90%/95% for four selected L/W indication ratios, and FIG. 16B illustrates a graph showing a computed CNR SF for POF=1% for four selected L/W indication ratios. A point (corresponding to a crack indication) that is below a particular L/W ratio curve may not be detected, and a point that is on or above a particular L/W ratio curve may be detected. In an example, a point 1610 in FIG. 16A is shown where the point 1610 is plotted for a crack indication having a L/W indication ratio=1.5, a resolution ratio of 2.2 and a CNR of 1.8. Point 1610 is detectable at a minimum POD/Conf.=90%/95% by a radiographic inspection system (e.g., system 500) at the selected set-up because the point 1610 is on or above the CNR SF curve for the L/W indication ratio=1.5. In another example, a point 1620 in FIG. 16A is shown where the point 1620 is plotted for a crack indication having a L/W indication ratio=1.5, a resolution ratio of 1.5, and a CNR of 1.5. Point 1620 is not detectable as a crack at a minimum POD/Conf.=90%/95% by the radiographic inspection system at the selected set-up because the point 1620 is below the CNR SF curve with the L/W indication ratio=1.5. Because the point 1620 is below the CNR SF curve, the crack indication is not detected with minimum POD/Conf.=90%/95%. Use of the CNR SF curve has the benefit of determining what crack indications identified by the radiographic inspection system are having a minimum POD/Conf.=90%/95%.

Point 1610 and point 1620 are also shown plotted in FIG. 16B. In FIG. 16B, point 1610 has less than POF=1% by a radiographic inspection system (e.g., system 500) at the selected set-up because the point 1610 is on or above the CNR SF curve for the L/W indication ratio=1.5. This means that the crack indication represented by point 1610 has less than POF=1%. Point 1620 has more than POF=1% by the radiographic inspection system at the selected set-up because the point 1620 is below the CNR SF curve with the L/W indication ratio=1.5. This means that the crack indication identified by point 1620 has more than POF=1%.

Figure 17A:
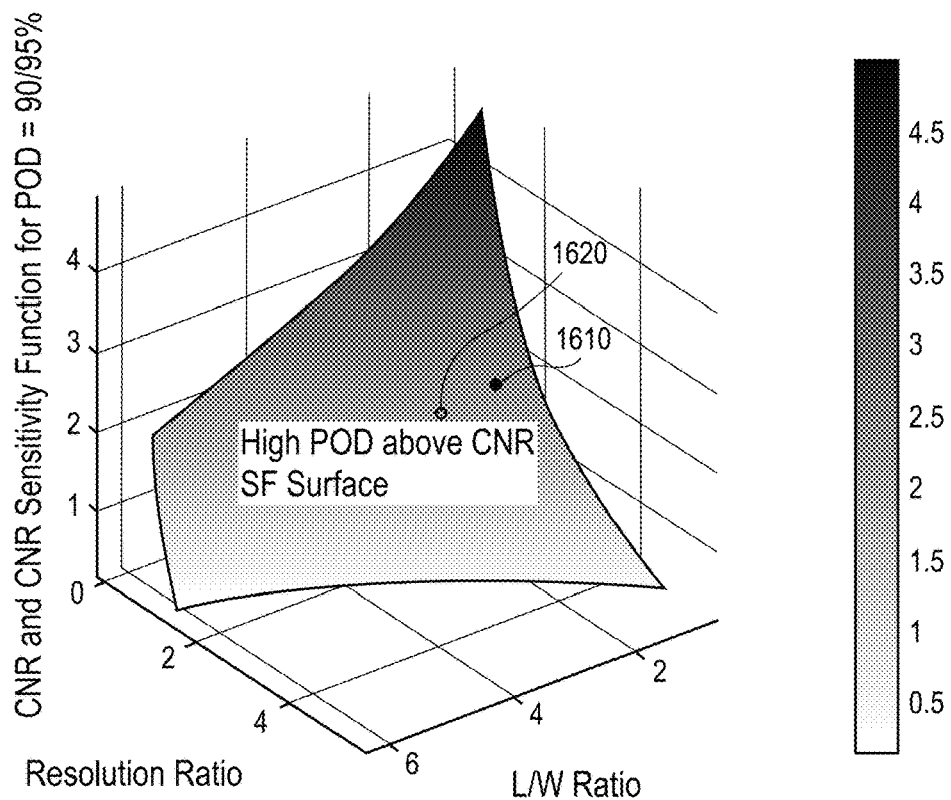
FIGS. 17A and 17B illustrate graphs showing CNR SF as a surface, according to an embodiment.
Figure 17B:
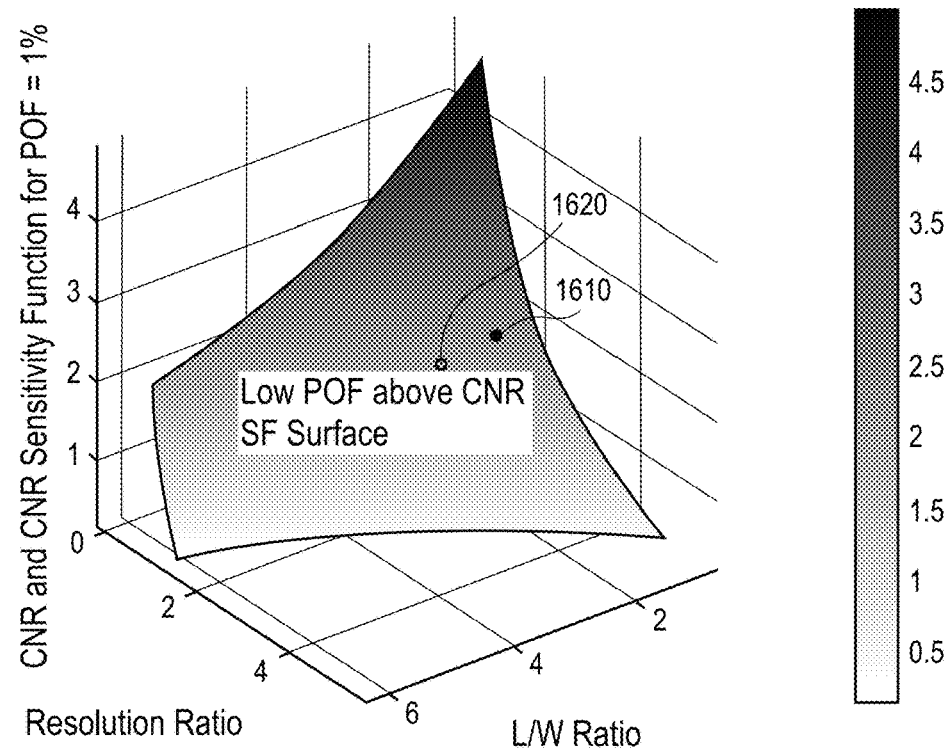

FIGS. 17A and 17B illustrate graphs showing CNR SF as a surface that plots a continuous range of L/W indication ratios and resolution ratios, according to an embodiment. FIGS. 17A and 17B include the same data as FIGS. 16A and 16B, respectively. However, FIG. 17A illustrates a graph showing a computed CNR SF for POD as a surface for a L/W indication range of L/W=1 to L/W=6 and a resolution range from 0.5 to 5, and FIG. 17B illustrates a graph showing a computed CNR SF for POF as a surface for a L/W indication range of L/W=1 to L/W=6 and a resolution range from 0.5 to 5.

In FIG. 17A, point 1610 is shown above the CNR SF surface to show that the crack indication represented by point 1610 is detectable at a minimum POD/Conf.=90%/95% by a radiographic inspection system (e.g., system 500) at the selected set-up because the point 1610 is on or above the CNR SF surface. In FIG. 17A, point 1620 is shown below the CNR SF surface. Point 1620 is not detectable at a minimum POD/Conf.=90%/95% by the radiographic inspection system at the selected set-up because the point 1620 is below the CNR SF curve with the L/W indication ratio=1.5.

In FIG. 17B, point 1610 has less than POF=1% by a radiographic inspection system (e.g., system 500) at the selected set-up because the point 1610 is on or above the CNR SF curve for the L/W indication ratio=1.5. Point 1620 has more than POF=1% by the radiographic inspection system at the selected set-up because the point 1620 is below the CNR SF curve with the L/W indication ratio=1.5.

The method 1500 may also include inspecting a component part 806 (see FIG. 8) using the qualified radiographic inspection system 500, as at 1512. The inspection may detect one or more cracks 808 (see FIG. 8) in the component part 806 with a size that is greater than or equal to a size of the target flaw 208B (see FIGS. 2A and 2B). For example, a qualified radiographic inspection system 500 with the selected set-up used to inspect the component part 806 has a minimum POD/Conf=90%/95% of detecting a selected target crack in the component part 806. More specifically, the qualified radiographic inspection system 500 performs an inspection on the component part 806 to determine output parameters, including a contrast-to-noise ratio (CNR), a resolution ratio, and/or a length-to-width (L/W) indication ratio for a crack indication. The radiographic inspection system 500 processes the output parameters for a crack indication based on the CNR SF function to determine if the crack indication is a detected crack having a minimum POD/Conf=90%/95%. If the radiographic inspection system 500 identifies a detected crack, the radiographic inspection system indicates that a detected crack has been identified. In some embodiments, the detected crack is identified by displaying an image indicative of a crack on a display.

A benefit of the radiographic inspection system, in accordance with some embodiments, is that the determination of the CNR SF function, described in block 1508, allows for a qualification IQI to qualify a number of different radiographic inspection systems having different set-ups. In some embodiments, the qualification IQI has an IQI slot with an IQI size, including length, width, and/or depth, that is selected to be larger than the target flaw size of the target flaw. Using the qualification IQI to qualify a radiographic system may eliminate the need to use a target size flaw in a test component to qualify a radiographic inspection system. This helps speed the time and limit the cost to qualify a radiographic inspection system.

During a qualification process, a radiographic inspection system may be configured in a first selected set-up having a set of selected input parameters. An operator of the radiographic inspection system may then be able to use an inspection IQI that has known IQI characteristics, including L/W indication ratio of the IQI slot, to perform a qualification inspection of a radiographic system in a first set-up by using the selected inspection IQI. If the radiographic inspection system having the first set-up is not qualified during the first qualification inspection based on the CNR SF, the operator may adjust the radiographic inspection system to a second set-up and perform a second qualification inspection using the inspection IQI. In this iterative manner, an operator may qualify a radiographic system for a selected set-up.

The CNR SF function determined in step 1508 may be the basis for qualifying a radiographic system using an IQI and also for determining if a crack indication detected by a qualified inspection system is a detected crack of at least target size.

In one embodiment, the method 1500 may include determining and/or generating a flaw indication image (see FIGS. 3A-3D, 4A, and 4B) for each simulated flaw. An indication length and/or an indication width of the flaw indication image may then be determined. A L/W indication ratio for each simulated flaw may then be determined based at least partially upon the indication length and the indication width. The detection of the target flaw (or the calibration flaw) may also or instead be based at least partially upon the L/W indication ratio.

The method 1500 may also include repairing the one or more cracks 708, 808 in the component part 806 or discarding the component part 806 in response to the detection of the one or more cracks 708, 808, as at 1514.

What is claimed is:

1. A method for detecting a target flaw using a radiographic inspection system, the method comprising:
   selecting a plurality of simulated flaws;
   performing a flaw detection simulation on the simulated flaws;
   determining a plurality of output indication parameters for each of the simulated flaws based at least partially upon the flaw detection simulation, wherein the output indication parameters comprise a contrast-to-noise ratio (CNR), a resolution ratio, a length-to-width (L/W) indication ratio, and a probability parameter;
   determining a contrast-to-noise ratio sensitivity function (CNR SF) based at least partially upon the output indication parameters; and
   qualifying the radiographic inspection system to detect the target flaw based at least partially upon the CNR SF.

2. The method of claim 1, wherein each of the simulated flaws comprises the target flaw or a calibration flaw, and wherein the calibration flaw comprises a user-manufactured flaw for an image quality indicator (IQI).

3. The method of claim 1, wherein the CNR SF comprises a CNR range, a resolution ratio range, a L/W indication ratio range, and a probability parameter threshold value.

4. The method of claim 1, further comprising inspecting a component part using the qualified radiographic inspection system to detect one or more cracks therein with a size that is greater than or equal to a size of the target flaw.

5. The method of claim 4, further comprising repairing the one or more cracks in the component part or discarding the component part in response to the detection of the one or more cracks.

6. A method for detecting a target flaw using a radiographic inspection system, the method comprising:
selecting a plurality of simulated flaws, wherein each of the simulated flaws has a simulated flaw size;
performing a flaw detection simulation on the simulated flaws;
determining a plurality of output indication parameters for each of the simulated flaws based at least partially upon the flaw detection simulation, wherein the output indication parameters comprise a contrast-to-noise ratio (CNR), a resolution ratio, a length-to-width (L/W) indication ratio, and a probability parameter;
determining a contrast-to-noise ratio sensitivity function (CNR SF) based at least partially upon the output indication parameters, wherein the CNR SF comprises a CNR range, a resolution ratio range, a L/W indication ratio range, and a probability parameter threshold value; and
qualifying the radiographic inspection system to detect the target flaw based at least partially upon the CNR SF.

7. The method of claim 6, wherein qualifying the radiographic inspection system to detect the target flaw comprises determining that a CNR value for the target flaw is greater than or equal to a corresponding CNR value of the CNR SF.

8. The method of claim 6, further comprising inspecting a component part using the qualified radiographic inspection system to detect one or more cracks therein with a size that is greater than or equal to a size of the target flaw.

9. The method of claim 8, further comprising repairing the one or more cracks in the component part or discarding the component part in response to the detection of the one or more cracks.

10. The method of claim 6, wherein the probability parameter comprises a probability of detection (POD) for each of the simulated flaws at least partially in response to performing the flaw detection simulation.

11. The method of claim 6, wherein the probability parameter comprises a probability of false positive (POF) for each of the simulated flaws at least partially in response to performing the flaw detection simulation.

12. The method of claim 6, wherein the probability parameter comprises a probability of detection (POD) and a probability of false positive (POF) for each of the simulated flaws at least partially in response to performing the flaw detection simulation.

13. The method of claim 6, wherein each of the simulated flaws comprises the target flaw or a calibration flaw, and wherein the calibration flaw comprises a user-manufactured flaw for an image quality indicator (IQI).

14. The method of claim 13, further comprising:
determining a flaw indication image for each simulated flaw;
determining an indication length and an indication width of the flaw indication image; and
determining a L/W indication ratio for each simulated flaw based at least partially upon the indication length and the indication width, wherein the detection of the target flaw or the calibration flaw is based at least partially upon the L/W indication ratio.

15. The method of claim 6, wherein determining the CNR SF comprises:
determining a first independent variable comprising a set of values for the resolution ratio range;
determining a second independent variable comprising a set of values for the L/W indication ratio range;
determining a dependent variable comprising a set of values for the CNR range, wherein a value of the dependent variable corresponds to the probability parameter threshold value for each simulated flaw; and
plotting a range of CNR SF values on a graph based at least partially upon the first independent variable, the second independent variable, and the dependent variable.

16. The method of claim 6, further comprising:
generating a simulated 2D indication image for each of the simulated flaws; and
calculating one or more 2D-extended output parameters based at least partially upon the simulated 2D indication image, wherein the CNR SF is also determined based at least partially upon the one or more 2D-extended output parameters.

17. The method of claim 16, wherein the one or more 2D-extended output parameters comprise:
a measured resolution ratio of an indication;
the L/W indication ratio;
a number of resolution size pixels in the indication;
a measured CNR on a real indication;
the probability parameter; or
a combination thereof.

18. A method for detecting a target flaw using a radiographic inspection system, the method comprising:
selecting a plurality of simulated flaws, wherein each of the simulated flaws has a simulated flaw size;
performing a flaw detection simulation on the simulated flaws;
determining a plurality of output indication parameters for each of the simulated flaws based at least partially upon the flaw detection simulation, wherein the output indication parameters comprise a contrast-to-noise ratio (CNR), a resolution ratio, a length-to-width (L/W) indication ratio, and a probability parameter, wherein the probability parameter comprises a probability of detection (POD), a probability of false positive (POF), or both for each of the simulated flaws at least partially in response to performing the flaw detection simulation;
determining a contrast-to-noise ratio sensitivity function (CNR SF) based at least partially upon the output indication parameters, wherein the CNR SF comprises a CNR range, a resolution ratio range, a L/W indication ratio range, and a probability parameter threshold value;
determining that a CNR value for the target flaw is greater than or equal to a corresponding CNR value of the CNR SF to qualify the radiographic inspection system to detect the target flaw;
inspecting a component part using the qualified radiographic inspection system to detect one or more cracks therein with a size that is greater than or equal to a size of the target flaw; and
repairing the one or more cracks in the component part or discarding the component part in response to the detection of the one or more cracks.

19. The method of claim 18, wherein each of the simulated flaws comprises the target flaw or a calibration flaw, wherein the calibration flaw comprises a user-manufactured flaw for an image quality indicator (IQI), and wherein the method further comprises:

- determining a flaw indication image for each simulated flaw;
- determining an indication length and an indication width of the flaw indication image; and
- determining a L/W indication ratio for each simulated flaw based at least partially upon the indication length and the indication width, wherein the detection of the target flaw or the calibration flaw is based at least partially upon the L/W indication ratio.

20. The method of claim 18, wherein determining the CNR SF comprises:

- determining a first independent variable comprising a set of values for the resolution ratio range;
- determining a second independent variable comprising a set of values for the L/W indication ratio range;
- determining a dependent variable comprising a set of values for the CNR range, wherein a value of the dependent variable corresponds to the probability parameter threshold value for each simulated flaw; and
- plotting a range of CNR SF values on a graph based at least partially upon the first independent variable, the second independent variable, and the dependent variable.

* * * * *